United States Patent [19]
Chiba et al.

[11] Patent Number: 5,898,984
[45] Date of Patent: May 4, 1999

[54] CYLINDER MEMBER HOLDER, MACHINING APPARATUS HAVING SAID HOLDER, AND MACHINING METHOD USING SAME

[75] Inventors: Hiroshi Chiba, Ebina; Yorihiro Kobayashi, Ryugasaki; Toshio Yamaguchi, Tamarimura, all of Japan

[73] Assignees: Canon Kabushiki Kaisha, Tokyo; Canon Kasei Kabushiki Kaisha, Ibaraki-ken, both of Japan

[21] Appl. No.: 08/881,076

[22] Filed: Jun. 24, 1997

[30] Foreign Application Priority Data

Jun. 25, 1996 [JP] Japan ................................. 8-164353
May 20, 1997 [JP] Japan ................................. 8-130060

[51] Int. Cl.$^6$ ............................. B23Q 5/22; B23B 1/00; B23B 5/12
[52] U.S. Cl. ............................. 29/33.7; 82/1.11; 82/130; 409/131; 451/4
[58] Field of Search ...................... 409/131, 141; 29/33.7, 33 D, 27 R; 408/143; 451/442, 4; 82/1.11, 70.2, 173, 163

[56] References Cited

U.S. PATENT DOCUMENTS 303,897  8/1884  Thomas ...................................... 82/130
2,691,921 10/1954 M+e,uml +ee ller ..................... 82/130

FOREIGN PATENT DOCUMENTS 64-58453  3/1989  Japan .
6-198501  8/1994  Japan .
6-304803 11/1994  Japan .
6-328303 11/1994  Japan .

OTHER PUBLICATIONS

S.A. Tobias, "Machine Tool Vibration," published by Corona-sha in 1968, translated by Sakae Yonezu, et al.

*Primary Examiner*—William Briggs
*Attorney, Agent, or Firm*—Fitzpatrick, Cella, Harper & Scinto

[57] ABSTRACT

A cylinder member holder is used to subject the outer circumferential surface of a cylinder member to cutting machining by non-rotatably supporting left and right ends of a tubular cylinder member by left and right holders and feeding a cutting tool longitudinally of the cylinder member while causing the cutting tool to rotate about the outer circumferential surface of the cylinder member. A plurality of discontinuous solid bodies which fill the inner diameter portion of the cylinder body so as to lie along the longitudinal direction thereof are inserted via a resilient body, thereby reducing or eliminating chatter vibration produced at cutting.

27 Claims, 40 Drawing Sheets

F I G. 4

| CYLINDER MEMBER (W) (OUTER DIAMETER D1 / INNER DIAMETER D2 / TOTAL LENGTH L1) | DIMENSIONS, WEIGHT AND ARRANGEMENT OF VIBRATION DAMPERS | | | |
|---|---|---|---|---|
| | RESILIENT BODY OUTER DIAMETER D3 / INNER DIAMETER D4 / TOTAL LENGTH L2 | ACCOMMODATED SOLID BODIES 30 SHAPE / MATERIAL / NUMBER | WITH / WITHOUT MASS DISTRIBUTION | TOTAL WEIGHT |
| φ12 / φ10.4 / 250 | φ10.3°−0.1 / φ8°−0.1 / 220 | 8-mm SPHERES / IRON / 23 | WITHOUT (HOMOGENEOUS DISTRIBUTION) | 65gf |
| φ16 / φ14.4 / 250 | φ14.3°−0.1 / φ11°−0.1 / 220 | 11-mm SPHERES / ALUMINUM / 17 | SAME AS ABOVE | 70gf |
| φ20 / φ18.4 / 330 | φ18.3°−0.1 / φ12°−0.1 / 300 | 12-mm SPHERES / NYLON / 15 | WITHOUT (LEFT END - CENTER) | 75gf |
| φ24 / φ22.4 / 250 | φ22.3°−0.1 / φ12°−0.1 / 220 | 12-mm SPHERES / NYLON / 15 | WITH (LEFT END) | 90gf |

F I G. 8

| TOOL rpm | WITHOUT VIBRATION DAMPERS | WITH VIBRATION DAMPERS |
|---|---|---|
| 3000 | NO CHATTER | NO CHATTER |
| 6000 | LOCAL CHATTER (LEFT END - CENTER) | NO CHATTER |
| 9000 | SUBSTANTIALLY OVERALL CHATTER | NO CHATTER |
| 12000 | MUCH CHATTER (BREAKAGE AT CENTER) | NO CHATTER |
| 15000 | MUCH CHATTER (BREAKAGE AT CENTER) | NO CHATTER |
| 18000 | MUCH CHATTER (BREAKAGE AT CENTER) | LOCAL CHATTER (ONLY LEFT END) |

FIG. 20

|  | OUTER DIAMETER / WALL THICKNESS (mm) | TOTAL LENGTH (mm) | WORKPIECE TARE (g) | VIBRATION DAMPER TARE (g) | DEFLECTION OF WORKPIECE ALONE (μm) | DEFLECTION ω WHEN VIBRATION DAMPERS HAVE BEEN INSERTED (μm) |
|---|---|---|---|---|---|---|
| CYLINDER MEMBER A | 12 / 0.8 | 250 | 19 | 65 | 1.1 | 4.9 |
| CYLINDER MEMBER B | 16 / 0.8 | 250 | 26 | 88 | 0.6 | 2.8 |
| CYLINDER MEMBER C | 20 / 0.8 | 250 | 33 | 127 | 0.5 | 2.6 |
| CYLINDER MEMBER D | 20 / 0.8 | 330 | 43 | 167 | 1.2 | 6.0 |

FIG. 21

| TARE COMPENSATING LOAD F (gf) | 0 (NONE) | 63 | 126 | 160 | 190 |
|---|---|---|---|---|---|
| AMOUNT OF DEFLECTION (μm) | 6.0 | 4.1 | 2.2 | ≈0 | −1.0 (REVERSAL OF DEFLECTION DIRECTION) |

F I G. 27

| TOOL ROTATING SPEED N (rpm) | CUTTING-FORCE FREQUENCY | STATUS OF CHATTER VIBRATION | SURFACE ROUGHNESS Rmax |
|---|---|---|---|
| 3000 | 100 | NONE | 1.5 μm |
| 6000 | 200 | LITTLE | 2.6 μm |
| 9000 | 300 | MODERATE | 5.1 μm |
| 12000 | 400 | MUCH | 12 μm |
| 15000 | 500 | MUCH (WORKPIECE BREAKAGE DURING MACHINING) | 15 μm |
| 18000 | 600 | MUCH (WORKPIECE BREAKAGE DURING MACHINING) | 15 μm |

FIG. 28

| CYLINDER MEMBER (W) (OUTER DIAMETER D1 / INNER DIAMETER D2 / TOTAL LENGTH L1) | DIMENSIONS, WEIGHT AND ARRANGEMENT OF VIBRATION DAMPERS ||||
|---|---|---|---|---|
| | RESILIENT BODY OUTER DIAMETER D3 / INNER DIAMETER D4 / TOTAL LENGTH L2 | ACCOMMODATED SOLID BODIES 30 SHAPE / MATERIAL / NUMBER | WITH / WITHOUT MASS DISTRIBUTION | TOTAL WEIGHT |
| φ12 / φ10.4 / 250 | φ10.3°−0.1 / φ8°−0.1 / 220 | 8-mm SPHERES / IRON / 23 | WITHOUT (HOMOGENEOUS DISTRIBUTION) | 65gf |
| φ16 / φ14.4 / 250 | φ14.3°−0.1 / φ11°−0.1 / 220 | 11-mm SPHERES / ALUMINUM / 17 | SAME AS ABOVE | 70gf |
| φ20 / φ18.4 / 330 | φ18.3°−0.1 / φ12°−0.1 / 300 | 12-mm SPHERES / NYLON / 15 | WITH (LEFT END - CENTER) | 75gf |
| φ24 / φ22.4 / 250 | φ22.3°−0.1 / φ12°−0.1 / 220 | 12-mm SPHERES / NYLON / 15 | WITH (LEFT END) | 90gf |

FIG. 29

| TOOL rpm | WITHOUT VIBRATION DAMPERS | WITH VIBRATION DAMPERS |
|---|---|---|
| 3000 | NO CHATTER | NO CHATTER |
| 6000 | LOCAL CHATTER (LEFT END - CENTER) | NO CHATTER |
| 9000 | SUBSTANTIALLY OVERALL CHATTER | NO CHATTER |
| 12000 | MUCH CHATTER (BREAKAGE AT CENTER) | NO CHATTER |
| 15000 | MUCH CHATTER (BREAKAGE AT CENTER) | NO CHATTER |
| 18000 | MUCH CHATTER (BREAKAGE AT CENTER) | LOCAL CHATTER (ONLY LEFT END) |

FIG. 30

| | OUTER DIAMETER / WALL THICKNESS (mm) | TOTAL LENGTH (mm) | WORKPIECE TARE (g) | VIBRATION DAMPER TARE (g) | DEFLECTION OF WORKPIECE ALONE ($\mu m$) | DEFLECTION $\omega$ WHEN VIBRATION DAMPERS HAVE BEEN INSERTED ($\mu m$) |
|---|---|---|---|---|---|---|
| CYLINDER MEMBER A | 12 / 0.8 | 250 | 19 | 65 | 1.1 | 4.9 |
| CYLINDER MEMBER B | 16 / 0.8 | 250 | 26 | 88 | 0.6 | 2.8 |
| CYLINDER MEMBER C | 20 / 0.8 | 250 | 33 | 127 | 0.5 | 2.6 |
| CYLINDER MEMBER D | 20 / 0.8 | 330 | 43 | 167 | 1.2 | 6.0 |

FIG. 31

| TARE COMPENSATING LOAD F (gf) | 0 (NONE) | 63 | 126 | 160 | 190 |
|---|---|---|---|---|---|
| AMOUNT OF DEFLECTION ($\mu m$) | 6.0 | 4.1 | 2.2 | ≃ 0 | −1.0 (REVERSAL OF DEFLECTION DIRECTION) |

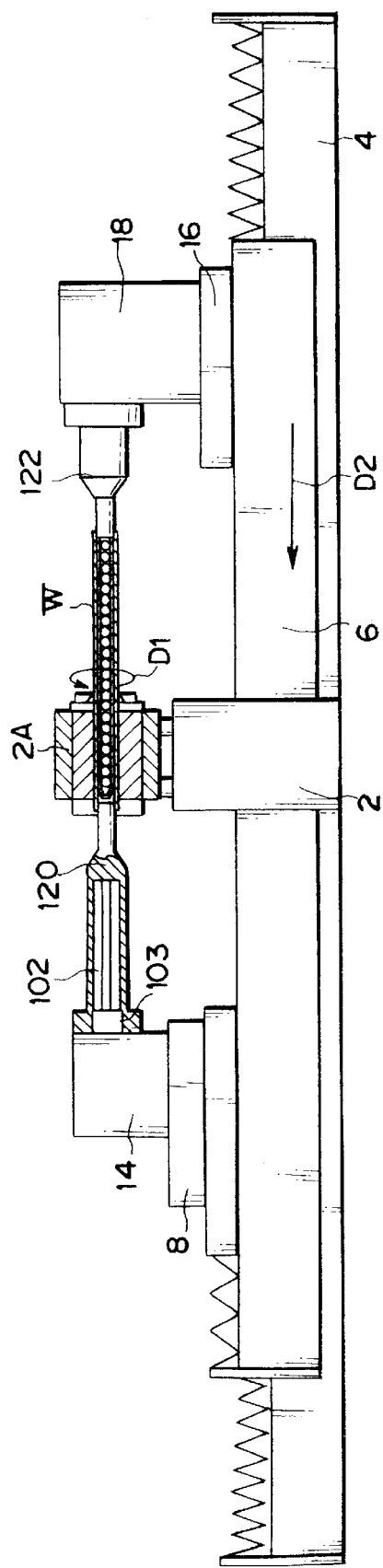

FIG. 39

| TOOL ROTATING SPEED N (rpm) | CUTTING-FORCE FREQUENCY (Hz) | STATUS OF CHATTER VIBRATION | SURFACE ROUGHNESS Rmax |
|---|---|---|---|
| 3000 | 100 | NONE | 1.5 μm |
| 6000 | 200 | LITTLE | 2.6 μm |
| 9000 | 300 | MODERATE | 5.1 μm |
| 12000 | 400 | MUCH | 12 μm |
| 15000 | 500 | MUCH (WORKPIECE BREAKAGE DURING MACHINING) | 15 μm |
| 18000 | 600 | MUCH (WORKPIECE BREAKAGE DURING MACHINING) | 15 μm |

F I G. 40

| TOOL ROTATING SPEED N (rpm) | CUTTING-FORCE FREQUENCY (Hz) | STATUS OF CHATTER VIBRATION | |
|---|---|---|---|
| | | WITHOUT VIBRATION DAMPERS | WITH VIBRATION DAMPERS INCORPORATED |
| 3000 | 100 | NONE | NONE |
| 6000 | 200 | LITTLE | NONE |
| 9000 | 300 | MODERATE | NONE |
| 12000 | 400 | MUCH | NONE |
| 15000 | 500 | MUCH (WORKPIECE BREAKAGE DURING MACHINING) | NONE |
| 18000 | 600 | MUCH (WORKPIECE BREAKAGE DURING MACHINING) | NONE |

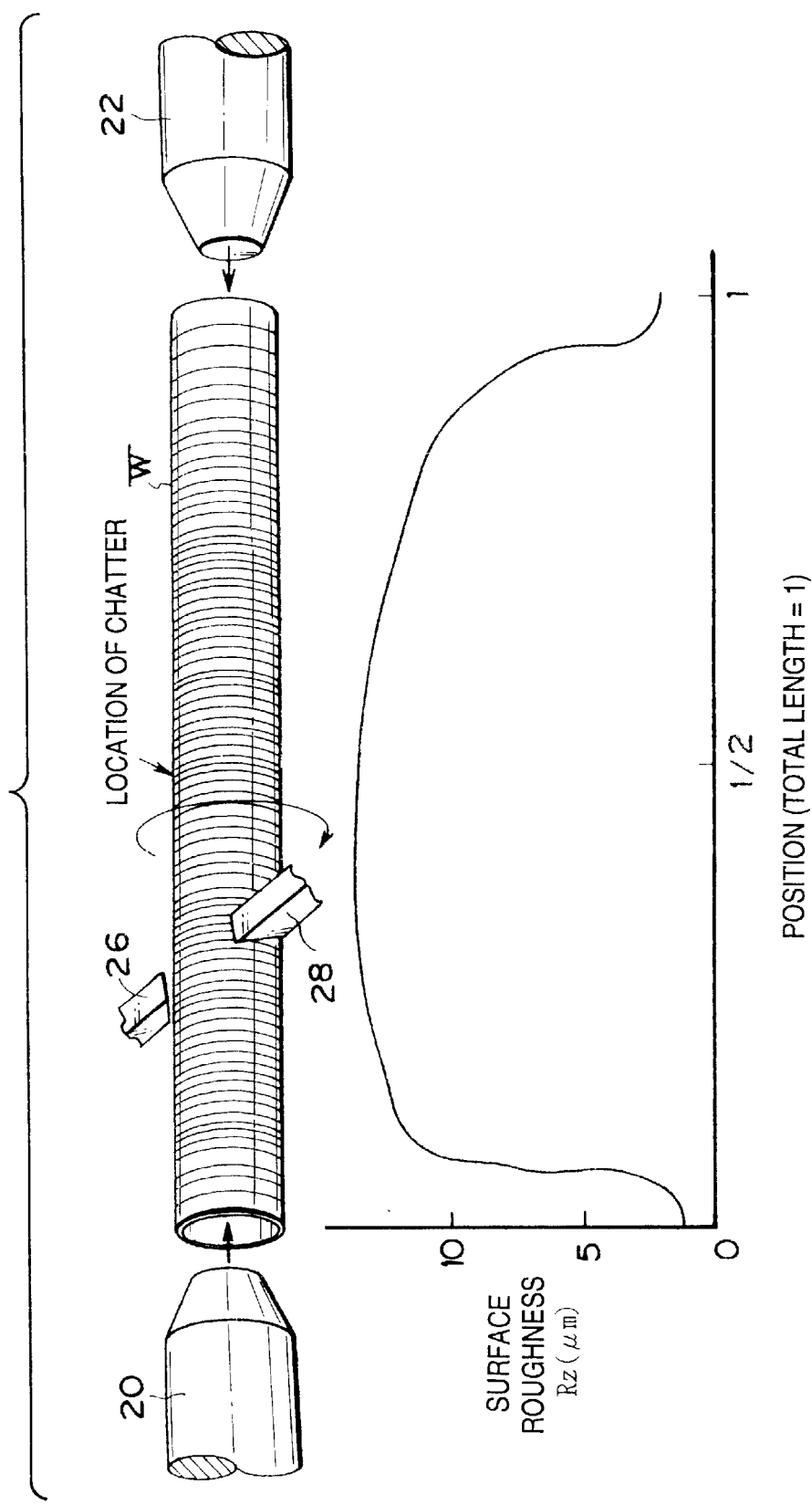

CYLINDER MEMBER HOLDER, MACHINING APPARATUS HAVING SAID HOLDER, AND MACHINING METHOD USING SAME

BACKGROUND OF THE INVENTION

This invention relates to a cylinder member holder, a machining apparatus equipped with the holder and a machining method using the holder. More particularly, the invention relates to art for machining the outer circumferential surface of a cylinder member such as a developing sleeve and photosensitive drum used in an image forming apparatus such as a copier or laser printer, wherein the outer circumferential surface of the cylinder member has a small thickness and a comparatively large length in the axial direction.

Conventionally, lathe machining is carried out when the outer circumferential surface of a cylinder member serving as a workpiece is subjected to cutting or grinding. More specifically, a cylinder member is held immovably in the rotating chuck of a lathe and, while the chuck is being rotated at the same time as the cylinder member by a rotating force from a lathe driving source, a cutting tool such as a cutter held on the apron of the lathe in a freely movable manner is fed toward the surface of the cylinder member to be machined, whereby the cylinder member is subjected to lathe machining. In accordance with such a lathe machining configuration in which the cylinder member is rotated and the cutter is fixed, cutting is carried out by stopping the rotary chuck after a lathe machining operation, removing the machining cylinder member from the chuck, setting a cylinder member in the chuck anew and then rotating the chuck again to perform cutting. This means that an operation for changing the cylinder member is always required when one lathe machining operation ends. A problem that arises is a decline in productivity since extra time is needed to change the cylinder member.

A machining method has been disclosed in the specification of Japanese Patent Application Laid-Open No. 6-328303 in order to improve productivity. According to this disclosed machining method, a cylinder member serving as a workpiece is held in a non-rotatable state by a chuck and a cutting tool is made to rotate about the outer circumferential surface of the cylinder member.

In accordance with this proposal, the operation for changing the cylinder member can proceed without stopping the operation for rotating the tool even after the machining of the outer circumferential surface of the cylinder member is finished. The improvement in productivity is thus achieved.

A cylinder member such as the developing sleeve used in the image forming apparatus described above is incorporated in a developing device in order for an image forming operation to be carried out. The finishing precision of the machined surface of the cylinder member is extremely important. However, when the productivity of the cylinder member is taken into account, the correlation between machining time and finishing precision takes on considerable importance.

Specifically, when the rotational speed of the tool and the feed rate of the tool are raised to improve productivity, chatter on the side of the cylinder member being held fast at both ends is produced, the accuracy of the cut surface declines and this in turn leads to production of defective articles.

As examples of methods for suppressing the occurrence of such chatter, the specifications of Japanese Patent Application Laid-Open Nos. 6-198501 and 6-304803 disclose methods of inserting a vibration damper consisting of a resilient body into the inner diameter portion of a cylinder member and cutting the outer circumferential surface of the cylinder member.

Though suppression of chatter vibration that arises in the cylinder member is performed effectively when such vibration is suppressed in this manner, suppression of chatter that develops on the side of the holder supporting the cylinder member is not always satisfactory. If the outer circumferential surface of the cylinder member is cut under these conditions, a decline in surface accuracy caused by chatter vibration occurs in the vicinity of the supported portions at both ends of the cylinder member held by the holder.

The applicant is aware of the technical documents concerning chatter which happens when cutting cylinder member such as mentioned above, which is titled as "Vibration of machining tools", published by CORONA-sha in 1968, translated by Sakae YONEZU et al., originally published by S. A. TOBIAS.

As shown in FIG. 41, the developing device of an image forming apparatus includes aphotosensitive drum 200 on which a latent image is exposed as image information. A developer G is moved to the drum 200 and is made to adhere thereto via a developing sleeve comprising a cylinder member W. The accuracy at which the developer G can be made to adhere to the photosensitive drum 200 from the developer storage location depends upon the precision to which the surface of the developing sleeve has been machined and the flatness of the sleeve.

Further, the precision to which the photosensitive drum 200 has been machined also has a major influence upon the accuracy (resolution) of the image as a matter of course.

FIG. 42 is a diagram illustrating the units necessary to construct a copier. In FIG. 42, information from an original (not shown) placed on a platen is formed on the photosensitive drum 200 in the form of a latent image, the latent image is then transferred to and fixed on a sheet of copy paper P, and the copy paper P bearing the fixed image is discharged from the apparatus to complete the copying operation.

In the process for fixing the image from the photosensitive drum 200, cylinder members W such as fixing rollers are used. If the precision to which the surfaces of the cylinder members are machined is low, the drum 200 and the photosensitive film develop unevenness. It is known that this has a major adverse influence upon image accuracy.

Good image clarity cannot be obtained unless a high surface accuracy, particularly a high degree of surface roughness precision, is achieved for the cylinder member W, such as the photosensitive drum, developing sleeve and fixing rollers, used in such an image forming apparatus as the copier or laser printer.

In accordance with a conventional method of machining a cylinder member, first a tube material is fabricated by extruding and drawing a metal material such as an aluminum alloy and then applying highly accurate correction of curvature. The tube material is then cut off to a desired length and the outer circumferential surface of the cut length is subjected to cutting by a lathe. However, since the cylinder member W used in the above-described image forming apparatus has a very small wall thickness in comparison with its length, chatter and other vibration easily occurs at cutting and has a deleterious effect upon the precision of surface roughness.

It is known that chatter and vibration which occur when the outer circumferential surface of a cylinder member is cut are produced owing to the relationship among the vibration characteristic of the cylinder member, the vibration characteristic of the holder and the machining frequency. This relationship will now be described.

When use is made of a special-purpose machining apparatus for holding both ends of a cylinder member immovably by left and right holders and cutting the cylinder member at a prescribed feed rate by a cutting tool while the cutting tool is rotated (this apparatus differs from the above-described lathe in that cutting is performed while rotating the cutter about the outer circumferential surface of the cylinder member), it is required that either the left or right holder have a total length through which a unit equipped with a rotary shaft to which the cutter is attached can be passed in order that the entire outer circumferential surface of the cylinder member may be cut. Specifications used in a test were as follows: maximum rotating speed of the unit: 20,000 rpm; actual rotating speed for machining: 9000~11,000 rpm; output power: 500W; inner diameter of rotating portion: 35 mm. As for the specifications of the left holder (of open-collet chuck type), through which the unit is passed: total length: 250 mm; maximum outer diameter of portion passed through rotary shaft: 30 mm; material: quenched steel. Since the right holder (of open-collet chuck type) is such that the unit need not be passed through rotary shaft, total length can be shortened. Accordingly, total length of right holder: 80 mm; maximum outer diameter: 30 mm; material: quenched steel.

The cylinder member used in cutting was aluminum alloy (JIS A-6063), had an outer diameter of 16 mm, a wall thickness of 0.8 mm and a total length of 250 mm.

The vibration characteristic, namely the relationship between compliance and frequency, was measured by the impulse excitation method in a state in which only the holders were attached to the cutting apparatus prior to machining and in a state in which the above-mentioned workpiece was supported on the cutting apparatus by the holders. The results are as shown in FIG. 43.

The value of compliance is the reciprocal of dynamic rigidity. The larger the value, the lower the dynamic rigidity and the greater the tendency of excitation.

As shown in FIG. 43, the compliance value gradually increases with an increase in frequency, with the value of compliance (dB) rising sharply at a point A (at which the frequency is about 380 Hz) in both the state in which only the holders were attached to the machining apparatus and the state in which the cylinder member was supported on the apparatus by the holders.

Since the compliance value rises sharply at the same frequency even in the state in which only the left holder is attached, this may be considered the primary characteristic frequency on the side of the special-purpose machining apparatus in the state in which the holders are attached to the apparatus.

Further, since the axial dimension of one holder is required to be of full length so that the unit having the rotary shaft with the attached cutter can be passed through the holder, the characteristic frequency is extremely low.

Though the compliance value decreases in a region of frequencies greater than the frequency at point A, the compliance value for the state in which the cylinder member is supported on the machining apparatus by the holders increases sharply in the vicinity of point B (at which the frequency is about 1000 Hz). This can be regarded as the primary characteristic frequency possessed by the cylinder member W.

Furthermore, the compliance value, which can be regarded as the primary characteristic frequency of the right holder and as the secondary characteristic frequency of the left holder, peaks in the vicinity of point C (at which the frequency is about 1800 Hz).

In a situation where the special-purpose machining apparatus and cylinder member have mutually different characteristic frequencies and a cutting force is applied though the cylinder member by the cutting operation, the cylinder member and special-purpose machining apparatus will resonate if the external force matches these characteristic frequencies. As a result, violent vibration develops even if the cutting force is very small.

FIG. 44 is a diagram drawn to emphasize the state of the cut surface of a workpiece under chatter vibration. It will be appreciated that cutting tracks are left on the surface along the path traversed by the cutting tool.

Accordingly, when the cutting conditions are set, it is necessary that the above-mentioned characteristic frequency and cutting frequency be separated to the utmost degree. The main factors which decide cutting frequency, which is one of the cutting conditions, are tool rpm and number of tools deployed in case of a special-purpose machining apparatus of tool rotating type. Though setting tool rpm high is effective in raising productivity since it contributes to shortening cutting time, vibration (chatter) is produced for the above said reasons when the characteristic frequency is approached.

The table of FIG. 27 illustrates the relationship between absence or presence of chatter vibration and surface roughness of a cylinder member when two cutting tools for coarse and finishing machining were attached to the rotary shaft and the cylinder member was cut while changing tool rpm.

It is obvious from the experimental results that chatter vibration is produced even in a region in which the frequency of the cutting force produced by tool rotation is remote from the above-mentioned characteristic frequency.

In other words, chatter vibration is produced even in a region in which compliance which is less than that at point A in FIG. 43 is increasing.

The specification of Japanese Patent Application Laid-Open No. 64-58453 proposes use of a viscous damper to prevent chatter vibration. According to this proposal, a resilient body such as rubber is inserted into a hollow cylinder member in a case where lathe machining is performed by rotating the hollow cylinder member and holding the tool fast against rotation. By adopting this arrangement, a centrifugal force is produced in the resilient body by rotating the cylinder member, thereby suppressing chatter vibration. With this turning apparatus such as a lathe, the overall length of the holder can be made small, unlike the case with the special-purpose machining apparatus of tool-rotating type. Consequently, the characteristic frequency of the holder can be set high. Further, since the cylinder member is rotated, the rotating speed for cutting is 5000 rpm (83 Hz in case of two cutting tools) at most owing to the problem of dynamic balance. Since even a vibration damper having a comparatively small vibration damping effect is satisfactory, the above-mentioned proposal seems to be practical.

On the other hand, in accordance with the present invention, the above-described special-purpose machining apparatus is used, the cylinder member is held fixed against rotation and cutting is performed while rotating the cutting tool about the outer circumference of the cylinder member. Since the cylinder member subjected to lathe machining does not rotate, a stable dynamic balance is achieved. This means that tool rpm can be set high and that cutting can be performed in a frequency region closer to the characteristic frequency. However, since more comprehensive vibration damping measures are required, it is necessary to use a vibration damping body having a much larger vibration damping effect.

Though an auxiliary mechanism such as pressure means may also be provided to prevent chatter vibration, setting the pressure value of the pressure means and adjusting the mounting position are troublesome operations and therefore this arrangement does not necessarily excel in terms of operability.

SUMMARY OF THE INVENTION

Accordingly, the present invention has been devised in view of the foregoing problems and a first object thereof is to raise the productivity of the operation for cutting the outer circumferential surface of a cylinder member.

A second object of the present invention is to provide a machining jig that is capable of suppressing chatter vibration of a machining tool and holders when the outer circumferential surface of a cylinder member is cut.

A third object of the present invention is to provide a special-purpose machining apparatus ideal for a case in which straightness in the axial direction and highly precise surface roughness are required of a cylinder member used in an image forming apparatus or the like.

A fourth object of the present invention is to provide a novel method of machining a cylinder member for use in an image forming apparatus.

According to the present invention, the foregoing objects are attained by providing a cylinder member holder, a machining apparatus equipped with the holder and a machining method using the holder, wherein left and right ends of a tubular cylinder member are supported in a non-rotatable state by left and right holders and a cutting tool is fed longitudinally of the cylinder member while being rotated about the outer circumferential surface of the cylinder member to thereby cut the outer circumferential surface of the cylinder member, characterized in that a plurality of discontinuous solid bodies which fill the inner diameter portion of the cylinder body so as to lie along the longitudinal direction thereof are inserted via a resilient body, chatter vibration produced at cutting being reduced or eliminated. The solid bodies are spheres having an outer diameter smaller than the inner diameter of the cylinder member.

Further, the solid bodies are formed to have the approximate shape of abacus beads having two or more continuous protrusions.

Further, the solid bodies are accommodated in an elongated bag of the resilient member.

Further, wherein at least part of the solid bodies have a mass distribution.

Further, when a plurality of the solid bodies have been inserted into the cylinder member, the length of the solid bodies in the axial direction of the cylinder member in the axial direction thereof is designed so as to fall within a range which is 20~50% of the length of the cylinder member in the axial direction thereof.

Further, a closed end of the elongated bag is provided with a hole and a plurality of the spheres are introduced into the bag from the other open end thereof, after which the opening of the elongated bag is provided with a plug.

Further, a plurality of spheres are introduced into the elongated bag from the other open end thereof, after which a viscous material which includes silicone oil is introduced to fill the bag and the opening of the elongated bag is provided with a plug.

Further, the plurality of spheres are integrally molded from a prescribed resin material having a prescribed hardness.

Further, according to the present invention, the foregoing objects are attained by providing a cylinder member holder, a machining apparatus equipped with the holder and a machining method using the holder, wherein left and right ends of a tubular cylinder member are supported in a non-rotatable state by left and right holders and a cutting tool is fed longitudinally of the cylinder member while being rotated about the outer circumferential surface of the cylinder member to thereby cut the outer circumferential surface of the cylinder member, characterized in that a resilient layer having a prescribed thickness is formed on the surfaces of rigid spherical bodies or cylindrical bodies in order that the rigid bodies may be inserted individually along the longitudinal direction of the cylinder member, and the rigid bodies are introduced to fill the inner diameter portion of the cylinder member, whereby chatter vibration produced at cutting is reduced or eliminated.

Further, according to the present invention, the foregoing objects are attained by providing a cylinder member holder, a machining apparatus equipped with the holder and a machining method using the holder, wherein left and right ends of a tubular cylinder member are supported in a non-rotatable state by left and right holders and a cutting tool is fed longitudinally of the cylinder member while being rotated about the outer circumferential surface of the cylinder member to thereby cut the outer circumferential surface of the cylinder member, characterized in that cylindrical resilient bodies introduced to fill left and right supports so as to lie along the longitudinal direction thereof are inserted into one or both of the left and right supports, which support the left and right ends of the cylinder member, chatter vibration produced at cutting being reduced or eliminated.

Further, according to the present invention, the foregoing objects are attained by providing a cylinder member holder, a machining apparatus equipped with the holder and a machining method using the holder, wherein left and right ends of a tubular cylinder member are supported in a non-rotatable state by left and right holders and a cutting tool is fed longitudinally of the cylinder member while being revolved about the outer circumferential surface of the cylinder member to thereby cut the outer circumferential surface of the cylinder member, characterized in that a plurality of cylindrical solid bodies introduced to fill left and right supports so as to lie along the longitudinal direction thereof are inserted into one or both of the left and right supports, which support the left and right ends of the cylinder member, chatter vibration produced at cutting being reduced or eliminated.

Further provided are a resilient body arranged so as to surround the solid bodies introduced so as to lie along the longitudinal direction of left and right supports.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a table showing the relationship between cylinder members and vibration dampers;

FIG. 8 is a table showing the relationship between tool rpm and chatter vibration;

FIG. 20 is a table showing the relationship between cylinder members and deflection;

FIG. 21 shows the results of measuring deflection along the longitudinal direction of a cylinder member;

FIG. 27 is a diagram showing the relationship between tool rpm and surface roughness;

FIG. 28 is a table showing combinations of cylinder members and vibration dampers;

FIG. 29 is a table showing tool rpm and the state of chatter occurrence when vibration dampers are and are not provided;

FIG. 30 is a table showing the amount of deflection when vibration dampers are accommodated within a cylinder member;

FIG. 31 is a table showing the relationship between a tare compensating load and amount of deflection;

FIG. 32 is a diagram showing the principal components of a special-purpose machining apparatus;

FIG. 39 is a table showing combinations of cylinder members and vibration dampers in the arrangement of FIG. 32;

FIG. 40 is a table showing chatter vibration when vibration dampers are accommodated within a cylinder member;

FIG. 44 is a central sectional view showing machining tracks left on the surface of a machined member owing to chatter vibration.

DESCRIPTION OF THE PREFERRED EMBODIMENTS

Preferred embodiments of the present invention will now be described with reference to the accompanying drawings and tables.

Figure 1:
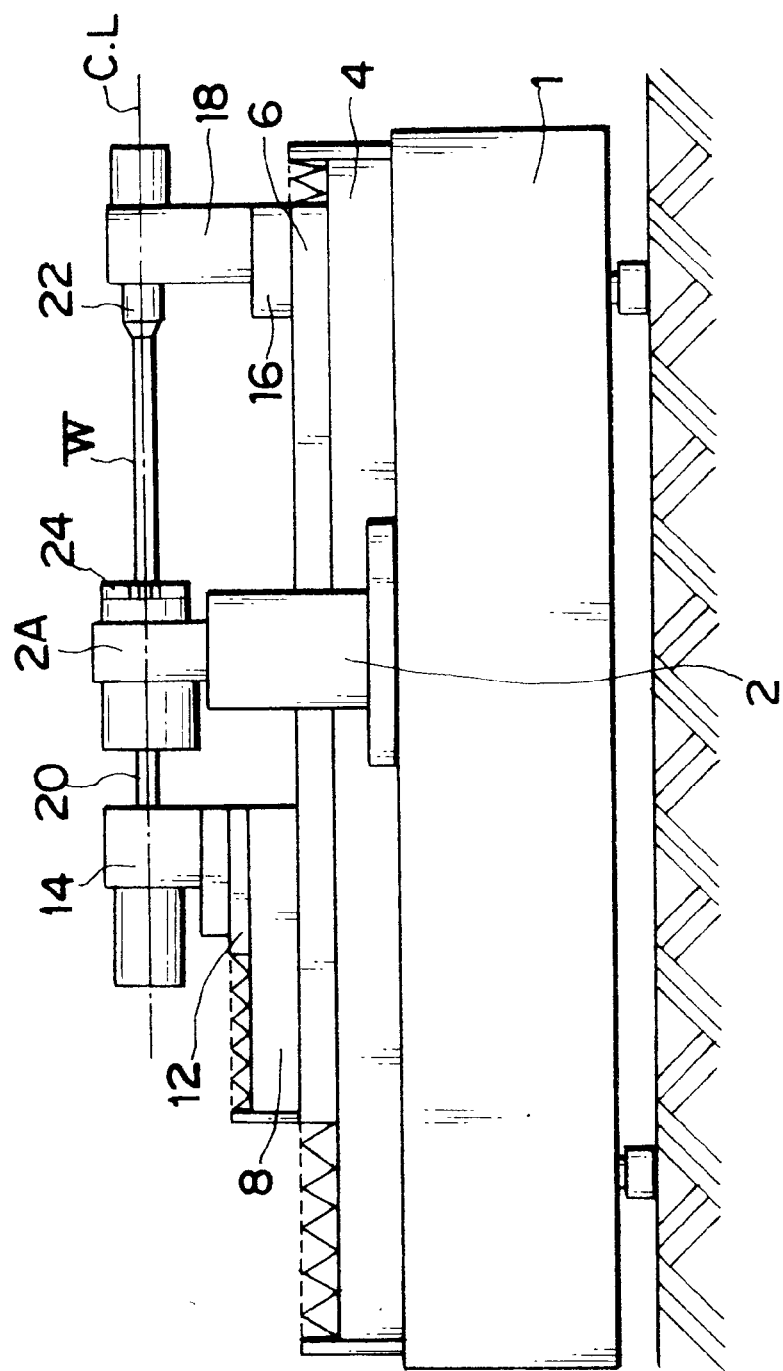
FIG. 1 is a diagram for describing the principal components of a special-purpose machining apparatus to which the present invention is applied.

FIG. 1 is a diagram for describing the principal components of a special-purpose machining apparatus used in a method of machining a cylinder member according to the present invention. All motor drive and control components are deleted from the drawing.

Shown in FIG. 1 are a bed 1 serving as the base of the apparatus and an arched column 2 mounted on the bed 1. A cutting tool, described later, is rotatably supported on the column 2. A table support base 4 is mounted on the bed 1 and a table member 6 slides on the table support base 4. A first slider support 8 is mounted on the left end of the table 6 in the view of FIG. 1, and a second slider support 16 is mounted on the right end of the table 6.

A first slider 12 is mounted on the first slider support 8, and a left post 14 is secured to the first slider 12. A second slider 18 is mounted on the second slider support 16, and a right post 18 is secured to the second slider support 16. A left cylinder-member holder 20 is mounted on the left post 14 and a right cylinder-member holder 22 is mounted on the right post 18. A cylinder member W is fixedly supported at both ends by the left cylinder-member holder 20 and the right cylinder-member holder 22.

Figure 2:
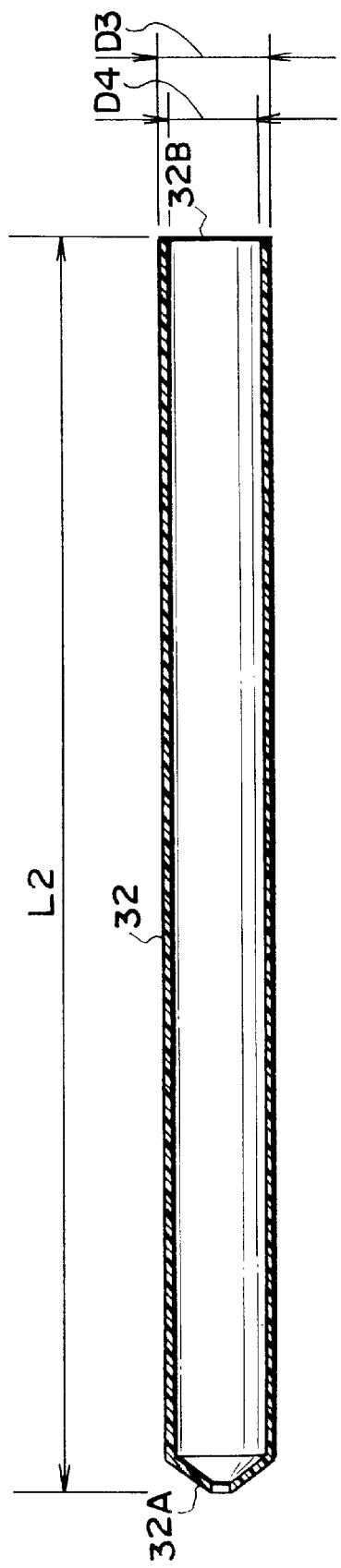
FIG. 2 is a sectional view of an elongated bag used in a machining tool.
Figure 7:
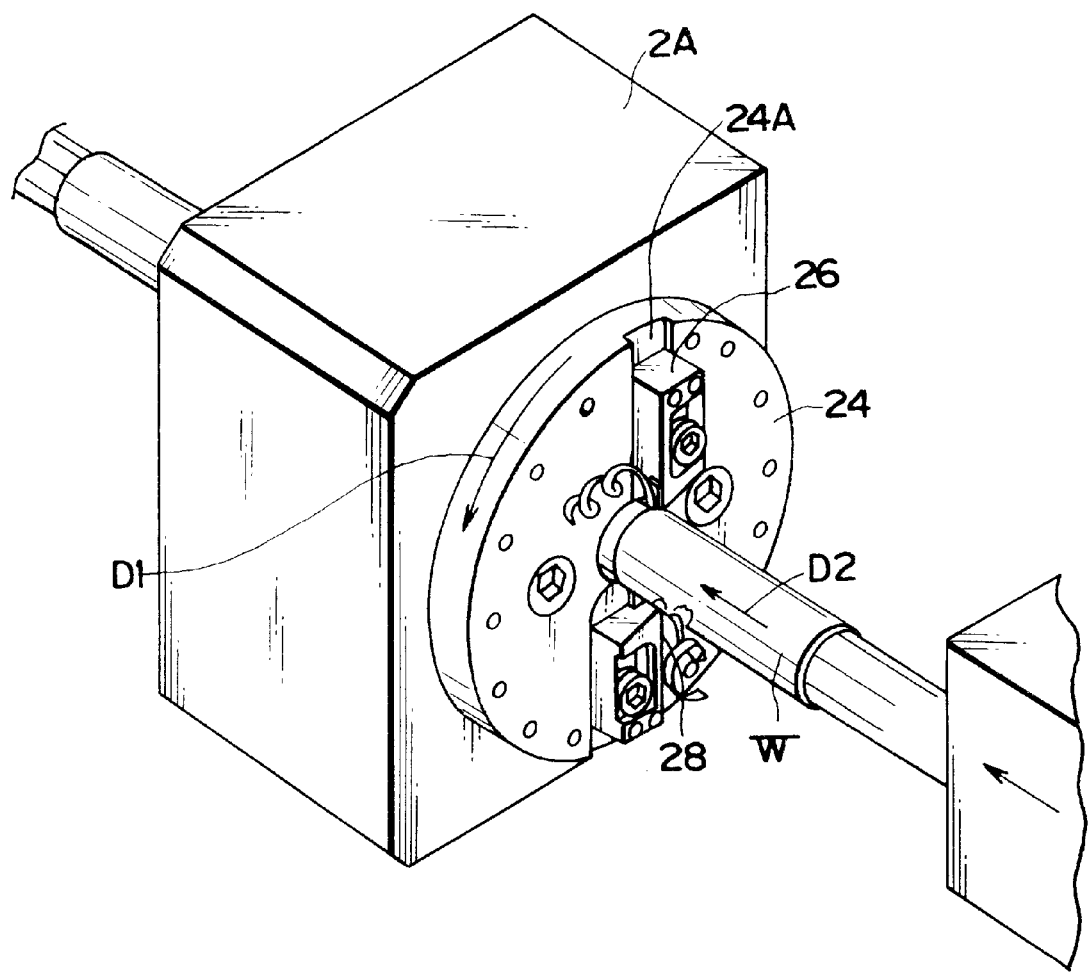
FIG. 7 is a diagram for describing state of machining by rotation of a tool in the apparatus of FIG. 1.

The arched column 2 has a bearing retaining member 2A in which the hollow shaft portion (not shown) of a cutting tool holder 24 illustrated in FIG. 2 is axially supported. The hollow portion of the hollow shaft portion of tool holder 24 is so adapted that the cylinder member to be machined may be passed through it. A tool holding portion 24A (FIG. 7) of the tool holder 24 is equipped with a holding portion which holds a finishing cutter 26 and a holding portion which holds a coarse cutter 28, each of the cutters being mounted by mounting means (screws).

Figure 3:
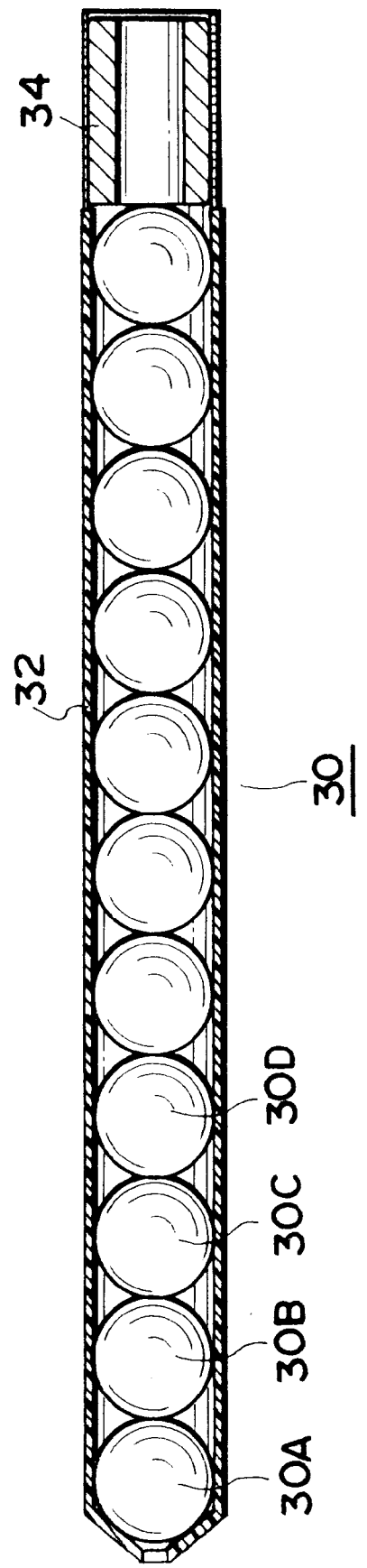
FIG. 3 is a sectional view of vibration damping means.

FIGS. 2 and 3 illustrate vibration damping means 30 introduced into the cylinder member W to be machined. The vibration damping means 30 comprises a plurality of solid bodies 30A, 30B, 30C, 30D . . . , an elongated bag 32 made of a resilient material for accommodating the solid bodies, and a plug member 34 for closing the opening of the elongated bag 32.

[First Embodiment]

A first embodiment of a machining method according to the present invention will now-be described.

The cylinder member W, which was to be machined into a developing sleeve used in the developing device of the above-described image forming apparatus, consisted of a Cu—Al alloy in which aluminum having purity of no less than 99.5% included 0.05~0.20% copper.

Alternatively, the cylinder member W consisted of a Cu—Mn—Al alloy which included 0.05~0.20% copper and 1.0 ~1.5% manganese, of a Si—Mg—Al alloy which included 0.20~0.60% silicon and 0.45~0.90% magnesium.

The raw material constituting the cylinder member was molded by extrusion or drawing to obtain cylinder members having the outer diameters, inner diameters and total lengths shown in FIG. 4. These cylinder members were the workpieces to be machined.

Figure 5:
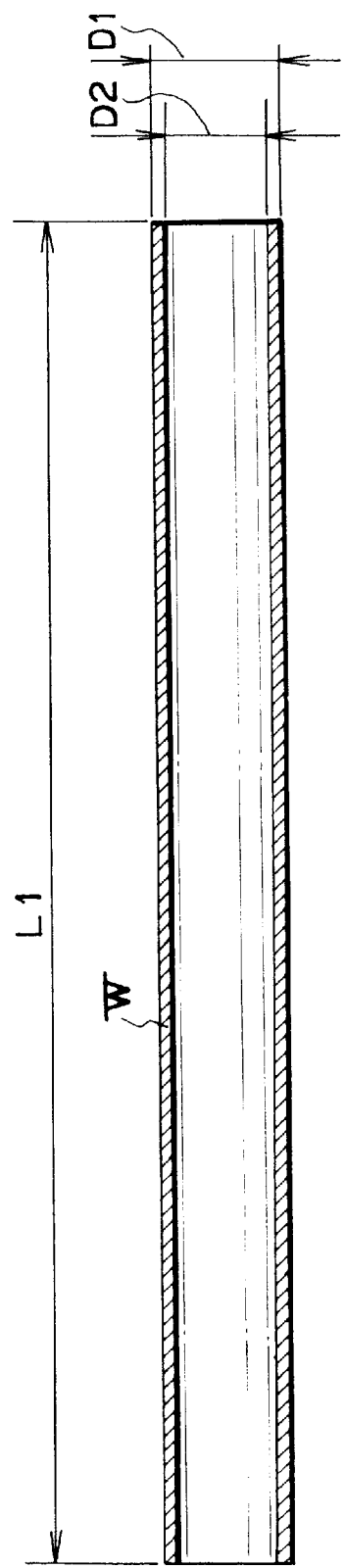
FIG. 5 is a sectional view of a cylinder member.

FIG. 5 is a sectional view showing the cylinder member W to be machined.

As for vibration damping means according to the first embodiment, the elongated bag 32 was made of a rubber material such as urethane rubber or silicone rubber the thickness of which was made 1.15 mm. The length was made 230 mm and outer diameter 10.3 mm. A rubber hardness of 40~80 is effective, with a hardness of 60 being used in this embodiment.

The solid bodies 30A, 30B, 30C, 30D . . . consisted of iron and were spherical in shape. Weight per sphere was as shown in the table of FIG. 4.

Twenty-three of the spheres were packed continuously in the resilient bag 32 in serial fashion and the opening of the bag 32 was closed by the plug member 34 (see FIG. 3).

Figure 6:
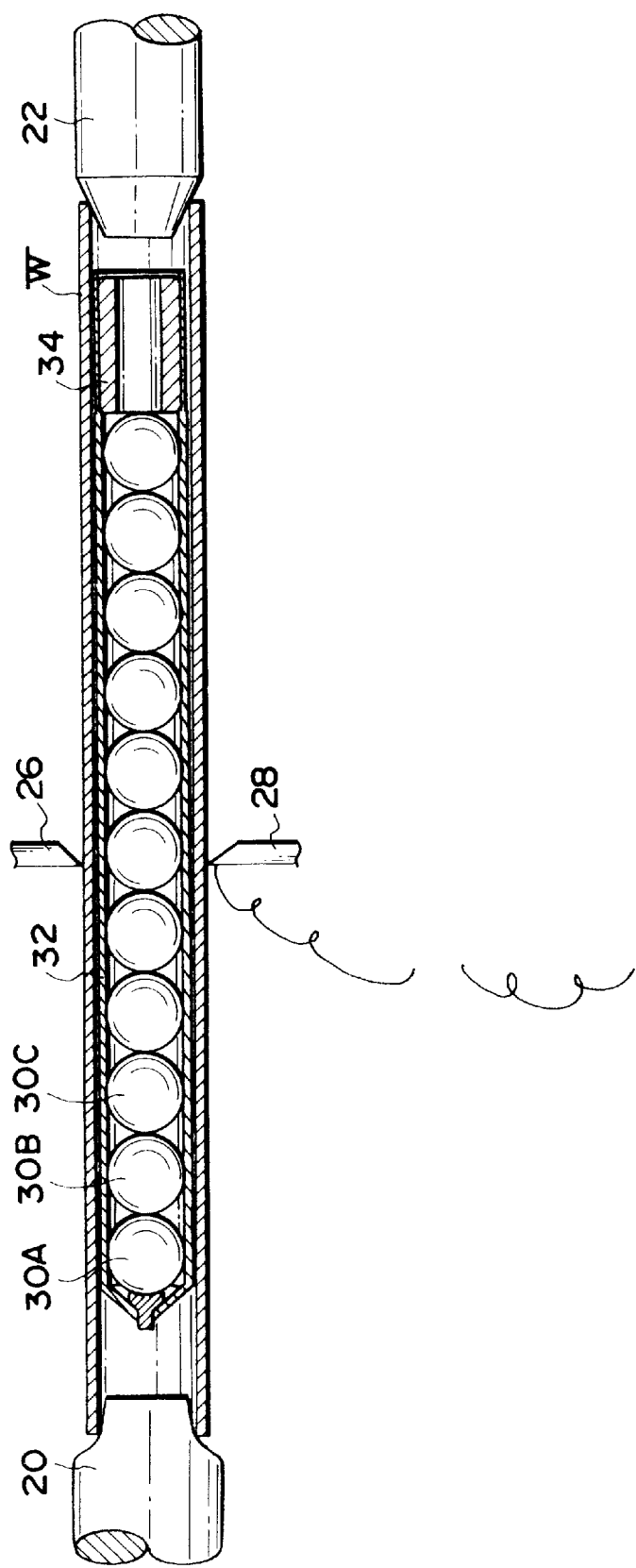
FIG. 6 is a central sectional view showing the manner in which vibration dampers have been inserted into a cylinder member.

The vibration damping means constructed as shown in FIG. 3 was inserted into the hollow portion of the cylinder member W to be machined, as shown in FIG. 6.

The cylinder member internally incorporating the vibration damping means in this fashion was passed through the hollow portion of the tool holder 24 mounted in the bearing holding member 2A of the arched column 2 shown in FIG. 1, and both ends of the cylinder member were held non-rotatably by the left cylinder-member holder and right cylinder-member holder.

After the cylinder member was set in this manner, the table 6 was placed at the left or right end and the position of the tool holder 24 was set at the starting position. The tool holder 24 was then rotated by drive means (a motor), not shown, connected to the tool holder. Furthermore, slider drive means for driving the aforementioned sliders was set to a slider feed rate.

In this example, machining was performed under the following conditions: depth of cut of coarse cutter: 0.06 mm; depth of cut of finishing cutter: 0.015 mm; tool holder rotating speed: 3000~18,000 rpm; feed rate of cylinder member: 5~30 mm/s (constant at 0.1 mm/rev).

FIG. 8 illustrates the results obtained in a case where machining was performed under the above-mentioned machining conditions with the above-described vibration damping means introduced into the cylinder member.

Figure 9:
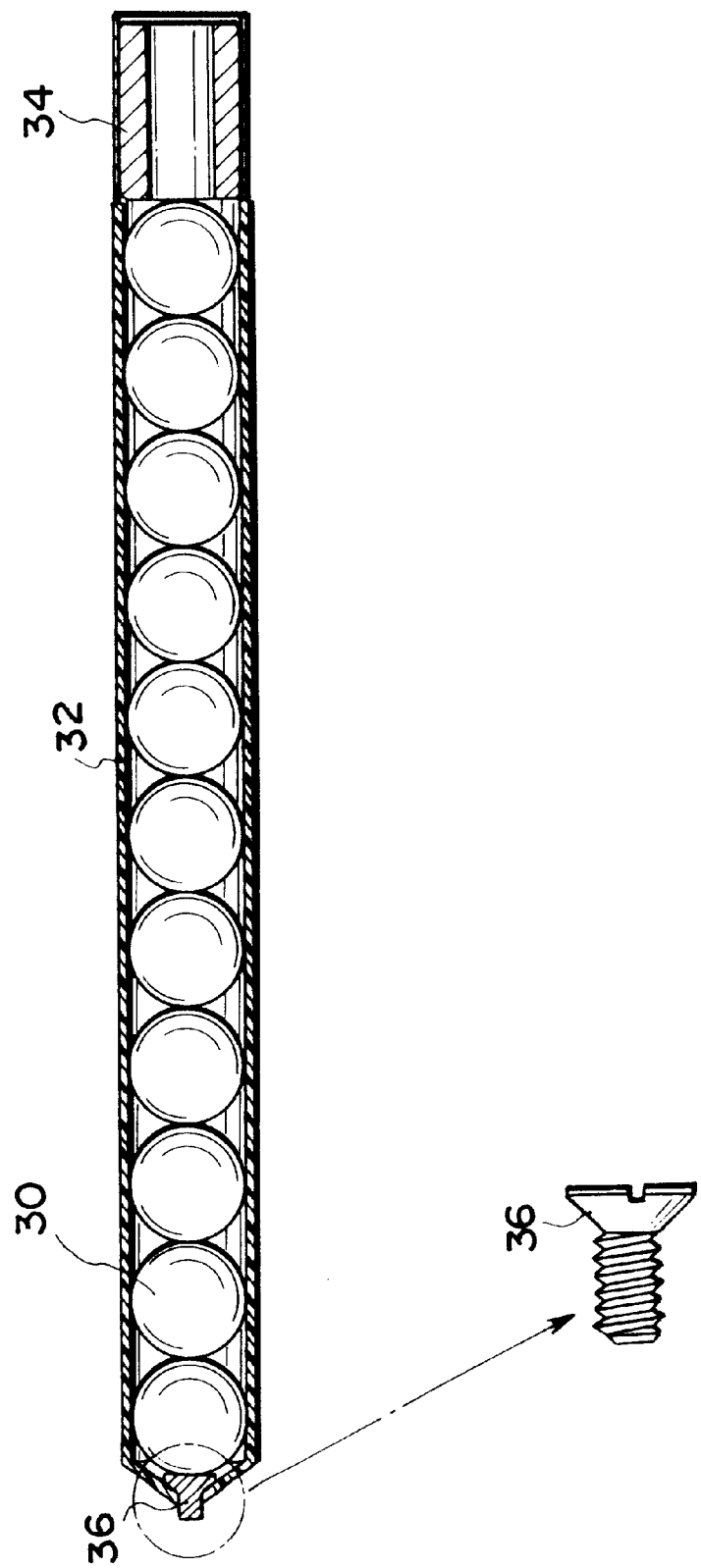
FIG. 9 is a central sectional view showing an example of an improvement in vibration damping means.

FIG. 9 is a proposed improvement in the vibration damping means according to the first embodiment.

In the case of the first embodiment, the resilient body 32 constituting the elongated bag has a closed end 32A defining an acute angle and having a hole in the tip thereof. The other end, shown at 32B, is shaped so that the spheres can be inserted.

When the resilient elongated bag 32 has been used a plurality of times, the positions at which the spheres are arrayed changes owing to stretching deformation of the resilient rubber. This invites a decline in the effectiveness of the vibration damping action.

Accordingly, the improvement of this example comprises means for fixing the positions of the spheres. By way of example, a screw-like member 36 for regulating the positions of the spheres is attached to tip of the closed end of the resilient elongated bag 32, as shown in FIG. 9. This improvement prolongs the lifetime of the resilient elongated bag.

[Second Embodiment]

Figure 10:
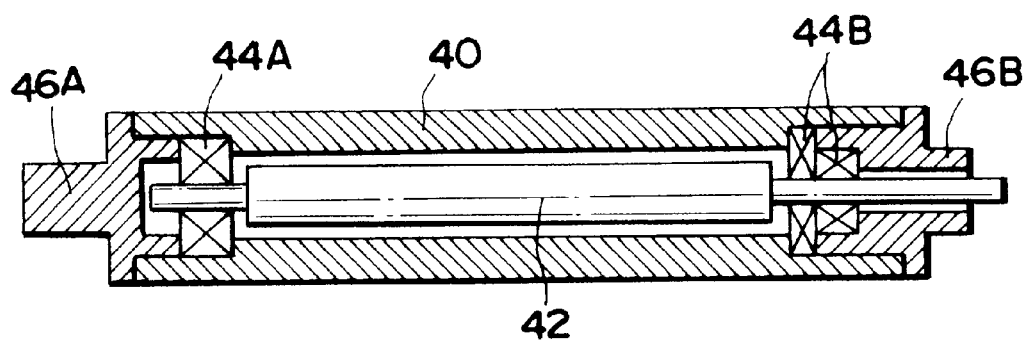
FIG. 10 is a diagram for describing a developing sleeve in which a magnet member is accommodated within a cylinder member.

FIG. 10 illustrates a developing sleeve unit in which a magnet 42 is accommodated within a developing sleeve 40.

As shown in FIG. 10, flange members 46A, 46B for receiving bearing members 44A, 44B are fitted inside the developing sleeve in order that the magnet 42 may be axially supported within the sleeve.

This embodiment, described below, illustrates a case where the outer circumferential surface of the cylinder member is machined in a state in which a bearing holding flange member has been fitted into one open end of the cylinder member.

Figure 11:
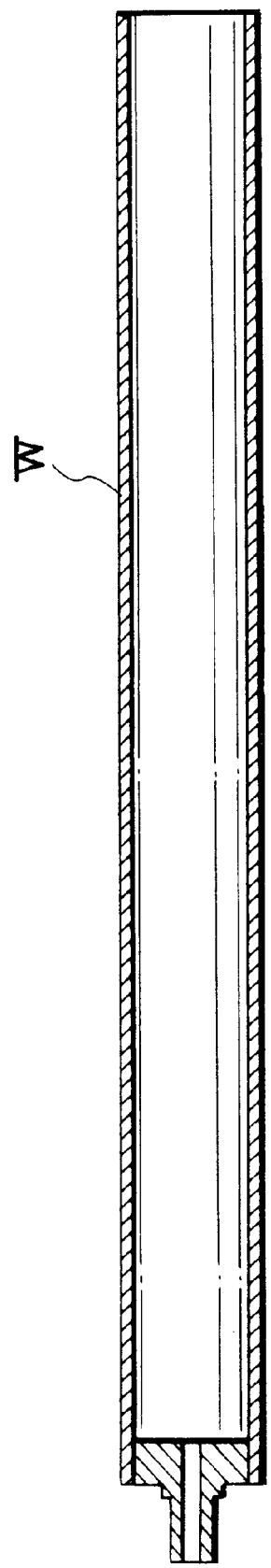
FIG. 11 is a sectional view showing a position limiting member.
Figure 12:
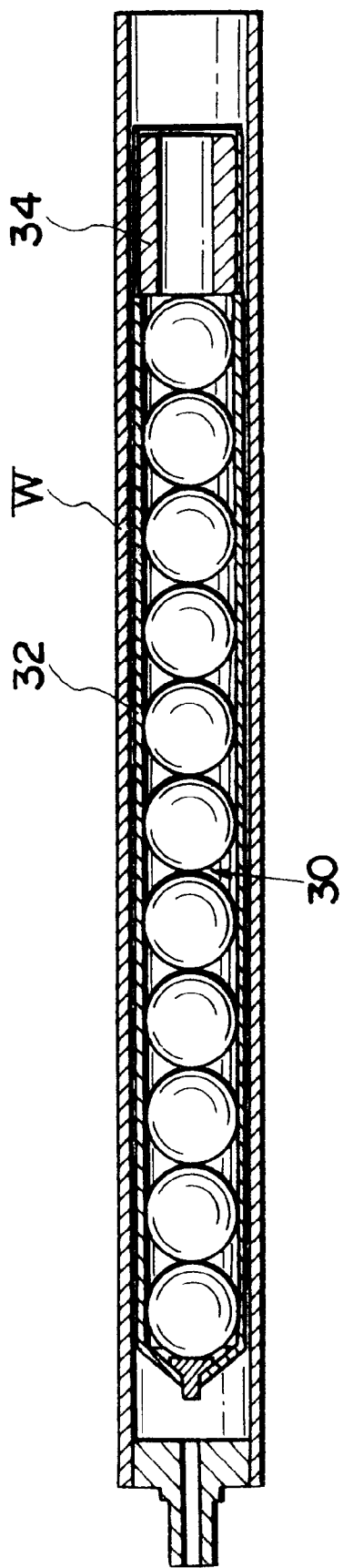
FIG. 12 is a central sectional view showing a state in which vibration dampers have been set in a cylinder member.

FIG. 11 is a sectional view showing the principal portion of the cylindrical sleeve member used in FIG. 10. In this embodiment, the flange member is fitted into the open end of the cylinder member and the vibration damping means 30, shown in FIG. 6, is inserted into the other open end (see FIG. 12).

[Third Embodiment]

In the vibration damping means 30 illustrated in the first and second embodiments, 11 of the spheres 30A, 30B, 30C, . . . of substantially identical shape are packed serially into the full length of the cylinder member W along the axial direction thereof. As shown in FIG. 6, the axial lengths of the vibration damping means and cylinder member to be machined leave a slight amount of dimensional margin. If vibration damping means 30 which is long in comparison with the length of the cylinder member is introduced, as in the foregoing embodiments, the vibration damping means 30 will be too heavy.

In the case of the first and second embodiments, a vibration damping effect was obtained with a tool rpm ranging from 3000 to 15,000 rpm, as will be understood from the table of FIG. 8.

Image forming apparatus of the type to which the present invention is applied continue to be reduced in size. This is accompanied by increasing reduction in the wall thickness of the developing sleeve. If heavy vibration damping means is introduced into a sleeve having a small wall thickness, the problem that arises is deflection or flexing of the sleeve. This embodiment is proposed as a solution to this problem.

Figure 13:
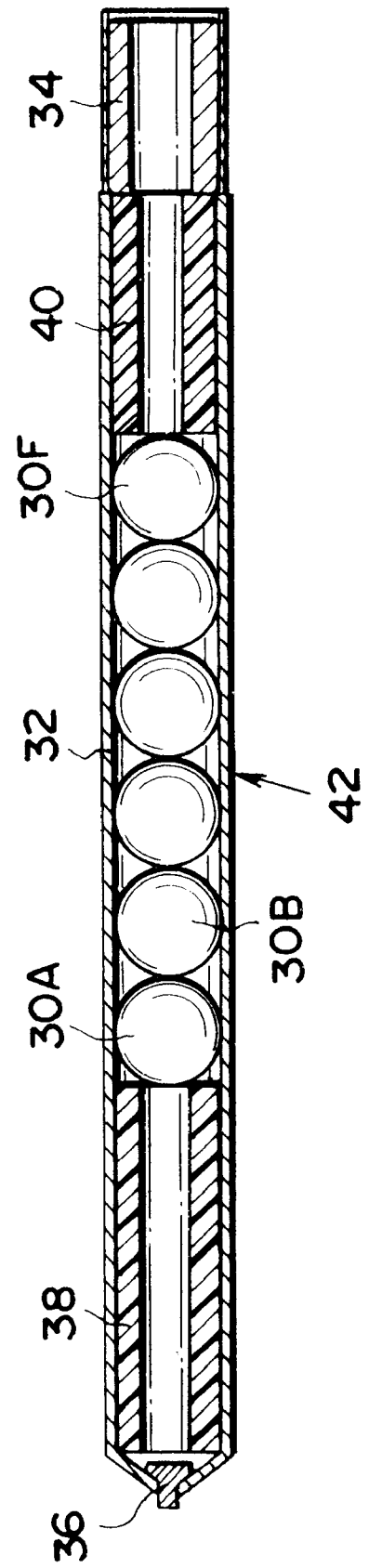
FIG. 13 is a central sectional view for describing a reduction in the weight of vibration dampers.

As shown in FIG. 13, a ring member 38 is inserted into the resilient elongated bag 32 at the closed end thereof, six of the spheres 30A~30F made of iron are packed serially into the bag, then a ring member 40 is inserted followed by the plug member 34 to close the bag. The ring members 38, 40 are made of a light-weight material such as synthetic resin, thereby reducing the overall weight of the vibration damping means.

Figure 14:
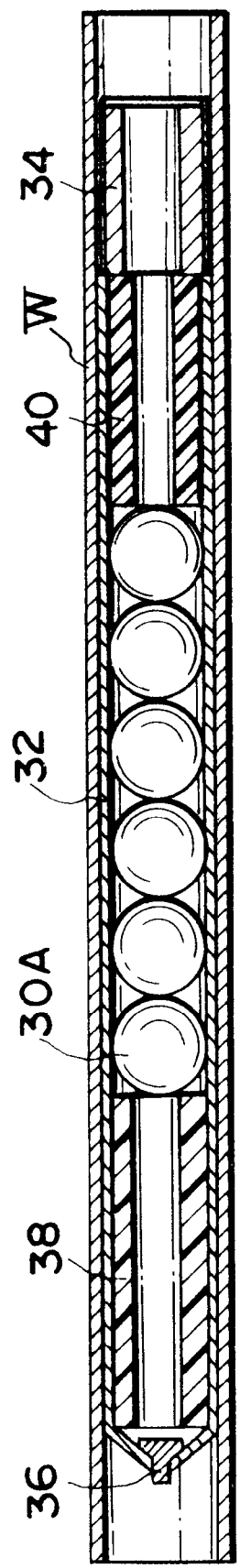
FIG. 14 is a central sectional view showing a state in which the vibration dampers of FIG. 13 have been set in a cylinder member.

FIG. 14 shows a state in which the vibration damping means of FIG. 13 has been set in a cylinder member to be machined.

The weight of the vibration damping means according to this embodiment is reduced by 40% over that of the vibration damping means 30 shown in FIG. 3.

[Fourth Embodiment]

Figure 15:
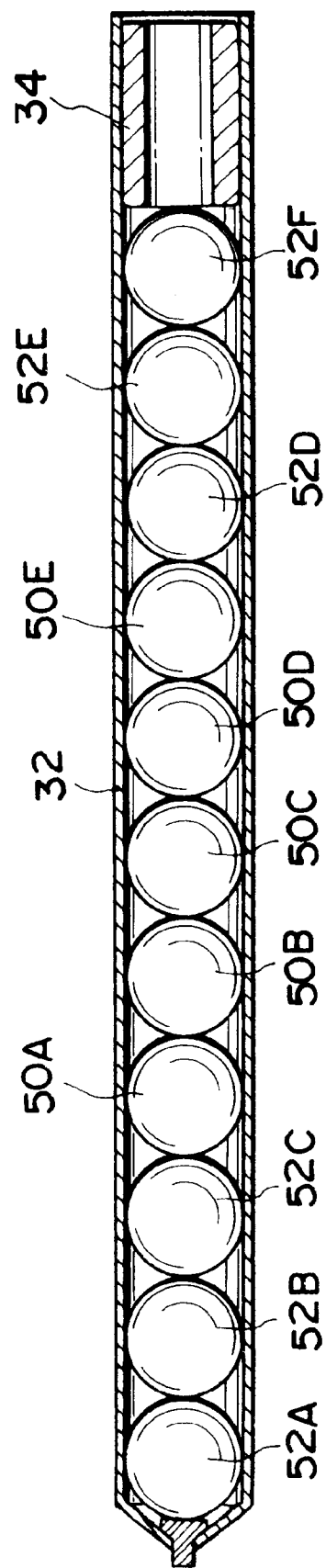
FIG. 15 is a central sectional view for describing a reduction in the weight of vibration dampers.

FIG. 15 illustrates another example of a reduction in the weight of the vibration damping means.

As shown in FIG. 15, spheres 50A~50E, which are located at the central portion of the resilient elongated bag 32, are made of iron. Spheres 52A, 52B, 53C located at one end and spheres 52D, 52E, 52F located at the other end are made of a synthetic resin material such as polyurethane, polypropylene or nylon, etc.

By thus using a plurality of spheres made of a heavy material at the central portion of the resilient elongated bag 32 and spheres made of a light material at both ends of the bag 32, the weight of the vibration damping means can be adjusted.

[Fifth Embodiment]

FIGS. 16, 17, 18 and 19 illustrate a fifth embodiment of the present invention.

According to this embodiment, a cylinder member to be machined is supported non-rotatably, a cutting tool such as a cutter is rotated about the outer circumferential surface of the cylinder member and is fed along the axial direction thereof, and the cylinder member is machined while deflection preventing pressure is applied to the outer periphery of the cylinder member by pressure means.

In the drawings mentioned above, the machining apparatus comprises the bearing, the table 4, the slider support 8, the slider 12, the left post 14, the right post 18, the cylinder-member holders 20, 22, the tool holder 24 and the cutter 26, which are the same as those in the first embodiment. The character W represents the workpiece, namely the cylinder member.

In a case where the cylinder member W is subjected to rotary cutting by the cutting tool while being supported non-rotatably by the left and right posts 20, 22, there is the danger that deflection X will occur owing to the weight of the resilient bag and steel spheres, which constitute the vibration damping means introduced into the hollow portion of the cylinder member, under conditions in which the material constituting the cylinder member is comparatively flexible, the cylinder member has a small wall thickness and is large in length.

The results shown in FIG. 20 were obtained in experiments performed by the inventors.

In accordance with FIG. 20, a comparison between a cylinder member A and a cylinder member B clearly shows that the smaller the outer diameter, the larger the deflection $\omega$ if overall length and wall thickness are held constant. A comparison of a cylinder member C and a cylinder member D clearly shows that the larger the overall length, the larger the deflection $\omega$ if the outer diameter and wall thickness are held constant.

Furthermore, the amount of deflection is much greater when the vibration damping means is inserted in comparison with the amount of deflection in the case of the cylinder member alone.

In the first through fourth embodiments described above, machining is performed while the vibration damping means is used to prevent chatter vibration caused by cutting the outer circumferential surface of the cylinder member by the revolving cutting tool. However, as set forth above, the problem of deflection arises owing to the relationship among the wall thickness and overall length of the cylinder member and the material constituting the cylinder member.

In a situation where the cylinder member is used as the photosensitive drum, developing sleeve or fixing rollers in an image forming apparatus such as a copier or laser printer, it is required that the allowable deflection fall within a range $\omega 1$.

Assume that the cylinder member is held in a special-purpose machining apparatus under the weight of the vibration damping means and cylinder member and in a highly deflected state and that the outer circumferential surface of the cylinder member is cut under these conditions. When the cylinder member is released from the machining apparatus after cutting and the vibration damping means is extracted, deflection which was present when the vibration damping means was inserted will appear owing to elastic recovery. This leads to a deterioration in the straightness of the cylinder member at its outer diameter.

Accordingly, it is required that the allowable amount of deflection $\omega 1$ be made less than the allowable straightness of the photosensitive drum, developing sleeve or fixing rollers.

In recent high-definition image forming apparatus, the allowable straightness of the above-mentioned parts is less than 10 $\omega$m. The allowable amount of deflection $\omega 1$ is required to be less than about 5 $\mu$m.

The inventors have conducted a variety of investigations in order to solve the deflection problem that arises during the machining of the cylinder member and have solved the problem by applying a force in a direction that corrects deflection, namely a force in a direction opposite the direction of deflection, to a position in the vicinity of the position machined by the cutter during the rotational machining of the outer circumferential surface of the cylinder member by the cutter.

FIG. 21 illustrates the actually measured values of amount of deflection obtained when a load F (referred to as "tare compensating load" below), directed from the bottom to the top of a cylinder member D, is varied in a state in which the cylinder member D is being held fast by the machining apparatus. The load F acts to correct deflection of the cylinder member D under a condition in which the cylinder member D exhibits the maximum value of deflection $\omega$.

As shown in FIG. 21, amount of deflection gradually decreases when the tare compensating load F is increased. Deflection is minimized when the tare compensating load F applied has a value substantially the same as the tare w of the cylinder member when the vibration damping means is inserted. When the tare compensating load F is increased further, the direction of deflection reverses and becomes upwardly directed.

The reasons for the foregoing will now be described.

If a load W attributed to the tare of the cylinder member when the vibration damping means has been inserted acts in the direction of gravity, namely from top to bottom, and no tare compensating load F is being applied, the cylinder member is deflected in the downward direction only.

Since the tare compensating load acts in a direction opposite that of gravity, namely from the bottom to the top of the cylinder member, deflection of the cylinder member when the tare compensating load F has a value the same as that of the tare of the cylinder member when the vibration damping means has been inserted becomes substantially zero. However, if the tare compensating load F is made larger than the tare of the cylinder member when the vibration damping means has been inserted, the cylinder member is deflected in the direction opposite that of gravity.

As shown in FIG. 20, when the cylinder member is fixedly supported non-rotatably at both ends in the machining apparatus and the outer circumferential surface of the cylinder member is cut by a tool such as a cutting tool, the outer periphery of the portion which develops the largest amount of deflection in the axial direction of the cylinder member experiences an increased amount of cutting and the machined shape thereof exhibits considerably waviness.

This embodiment of the invention proposes to prevent deflection of the cylinder member in a case where the surface of the cylinder member is machined upon insertion of the vibration damping means at the time of machining, thereby making it possible to assure surface finishing precision and precision of straightness in the axial direction of the machined cylinder member.

Figure 19:
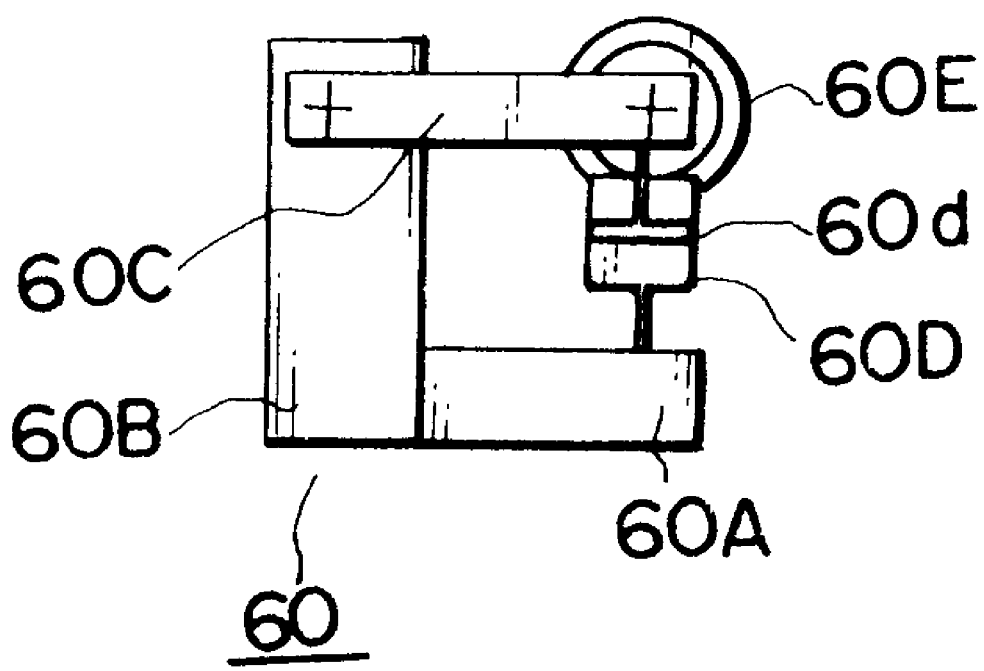
FIG. 19 is a diagram for describing the construction of deflection correcting means.

FIG. 19 illustrates deflection correcting means 60, which has a base 60A, a holding member 60B secured to the base 60A and an arm member 60C extending from the holding member 60B. One end of the arm member 60C is rotatably supported on the holding member 60B, and the other end (the free end) of the arm member 60C is secured to a piston 60d of a hydraulic cylinder 60D. A roller member 60E is attached to the free end of the arm member 60C.

The magnitude of the tare compensating load F can be freely adjusted on the free-end side of the arm member 60C in conformity with the hydraulic load of the cylinder 60D.

Figure 16:
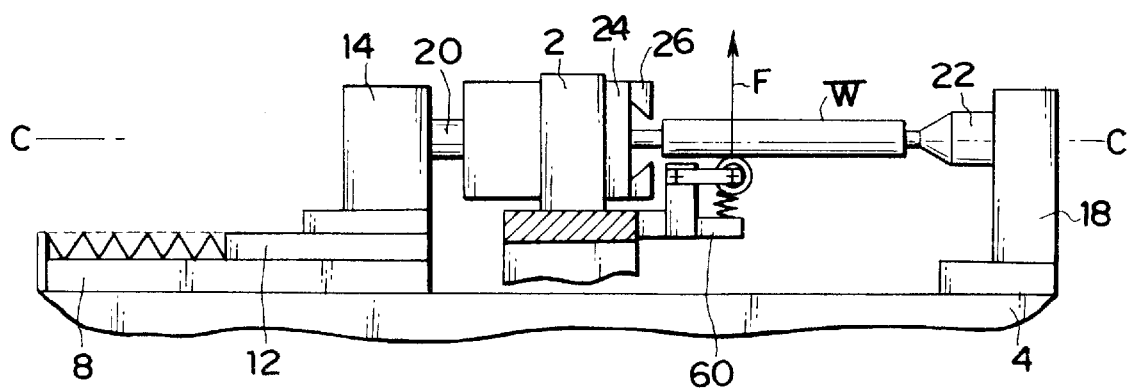
FIG. 16 is an explanatory view in which a deflection correction is applied to a cylinder member.

FIG. 16 illustrates the deflection correcting means 60 attached to the machining apparatus of FIG. 1.

Figure 17:
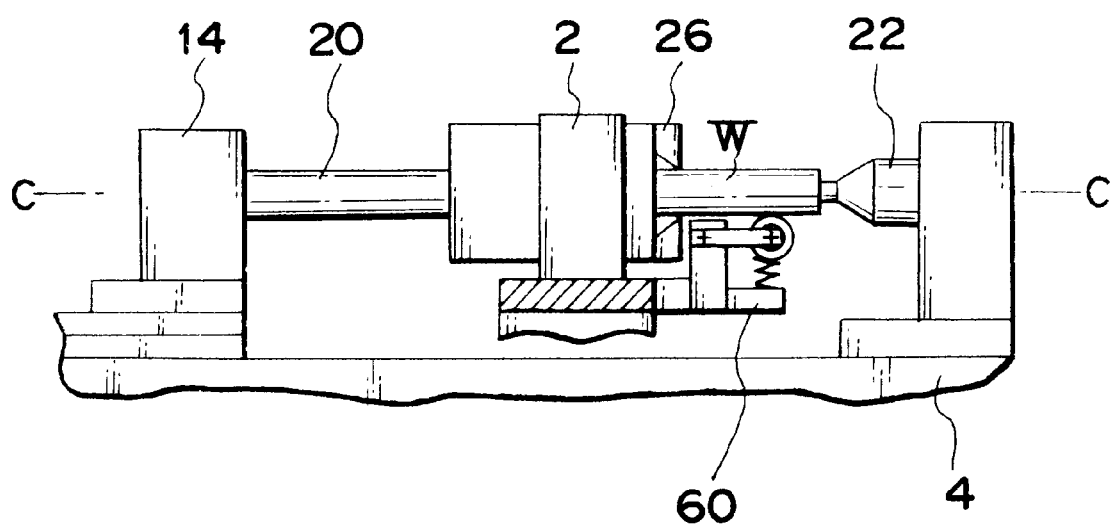
FIG. 17 is an explanatory view in which a deflection correction is applied to a cylinder member.
Figure 18:
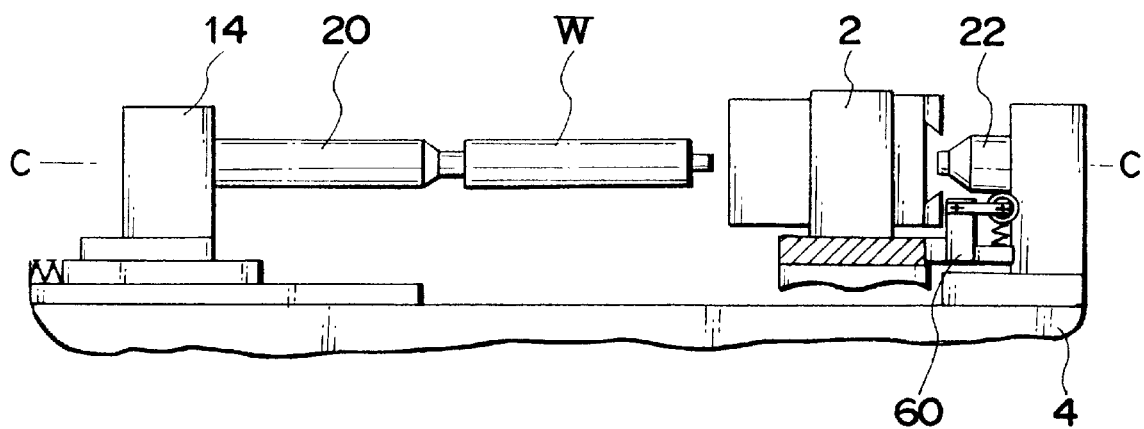
FIG. 18 is an explanatory view in which a deflection correction is applied to a cylinder member.

As shown in FIGS. 16 through 18, the deflection correcting means 60 is mounted on the arched column 2 and it is so arranged that the roller member 60E contacts the lower side of the cylinder member W held non-rotatably by the left and right cylinder-member holders 20, 22.

The dimensions of the cylinder member were as follows: outer diameter: 20 mm; wall thickness: 0.8 mm; overall length: 330 mm. The construction of the vibration damping means was that shown in FIG. 3, with the weight of the vibration damping means being 167 g and the tare compensating load F being set at 200 gf (0.2N).

The machining conditions were as follows: cutting oil: illuminating kerosene; flow rate: 0.25 cc/s; depths of cut of coarse/finishing cutting tools: 0.06 mm/0.02 mm; tool holder rotating speed: 11,000 rpm; cutting feed rate: 21 mm/s; nose corner radii of coarse/finishing cutting tools: 0.05 mm/2 mm.

The above-mentioned conditions were set and the outer circumferential surface of the cylinder member was machined at a cutting feed rate of 21 mm/s by moving the tool holder from the cutting starting point shown in FIG. 16. Machining was performed while the deflection of the cylinder member was corrected, this being performed while moving the load position of the tare compensating load by the roller member of the deflection correcting means 60 in dependence upon a change in the machining positions shown in FIG. 16 through 18. As a result, the outer circumferential surface of the cylinder member was machined in a state in which the deflection of the cylinder member was corrected.

A surface roughness gauge (Surfcorder SE-3300, manufactured by Kosaka Laboratories) was used to measure the surface roughness of the cylinder member at a measurement speed of 0.5 mm/s, measurement length of 2.5 mm and a cut-off of 0.8 mm. The result Rmax obtained was 1.2 $\mu$m.

The straightness of the outer circumferential surface was measured using a laser displacement meter (manufactured by Keyence). The average value was 3 $\mu$m and the standard deviation $\sigma$ was 0.5 $\mu$m (number of machined samples: 100). Thus, a high precision which fully meets the precision of 10 $\mu$m required of a developing sleeve used in a laser printer capable of providing a high-definition image could be obtained in stable fashion.

[Sixth Embodiment]

Figure 22:
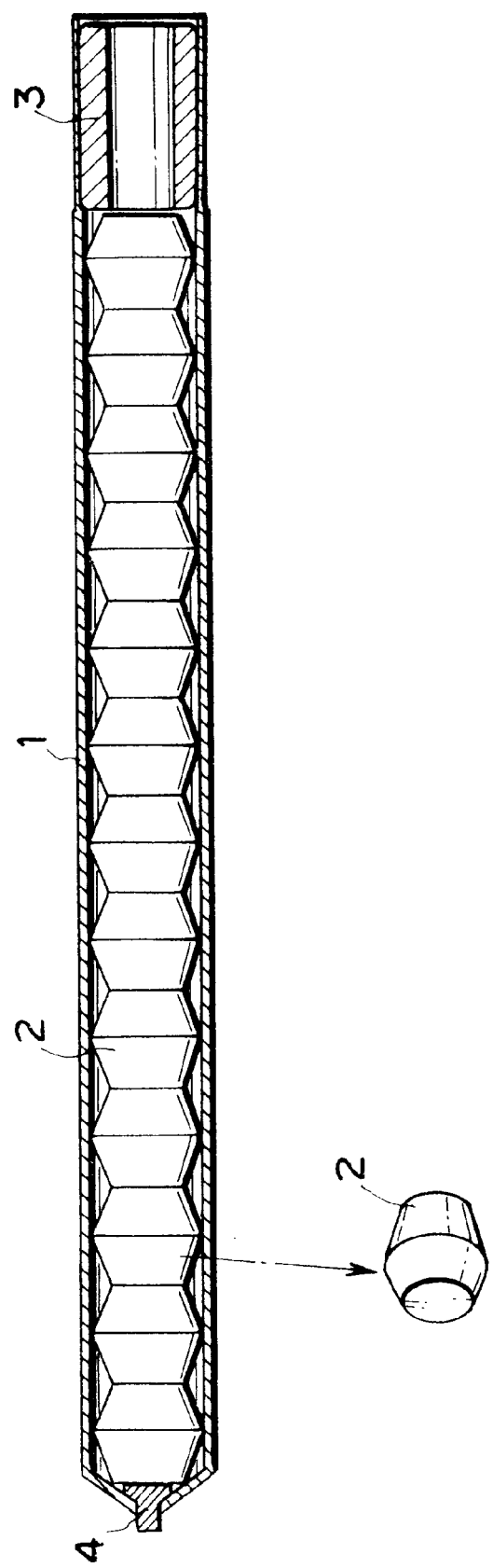
FIG. 22 is a central sectional view showing a modification of vibration dampers.
Figure 23:
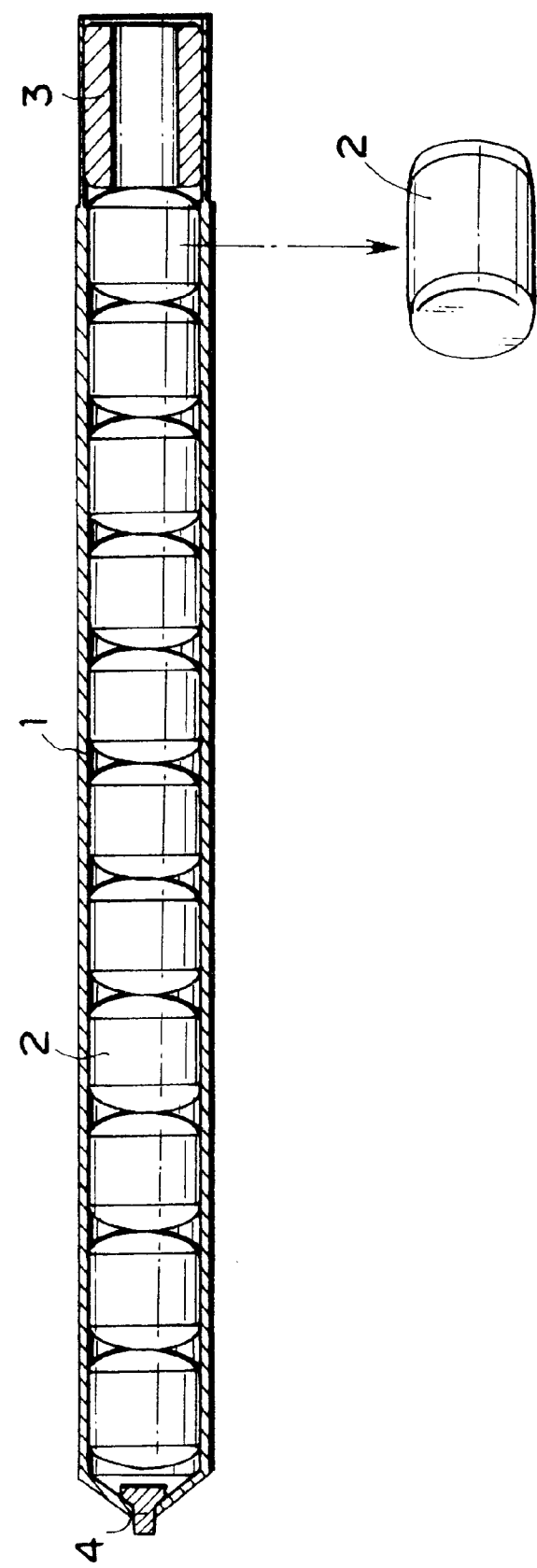
FIG. 23 is a central sectional view showing another modification of vibration dampers.
Figure 24:
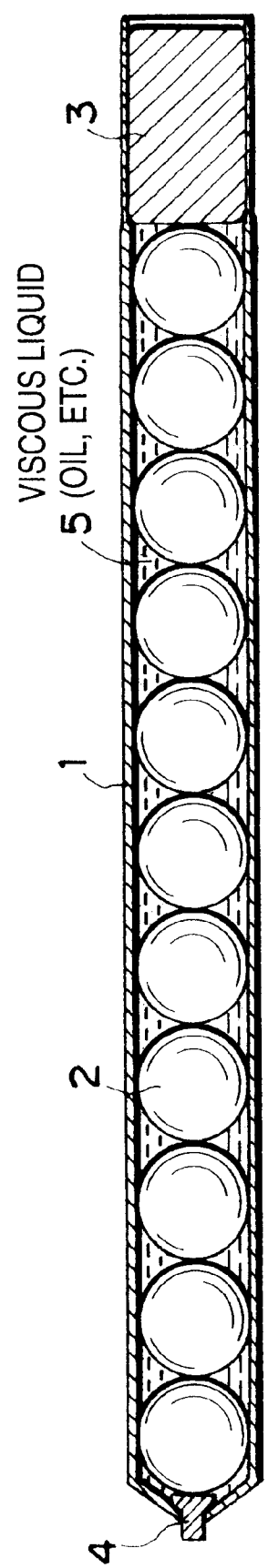
FIG. 24 is a central sectional view showing another modification of vibration dampers.

FIGS. 22 through 24 illustrate other examples of vibration damping means according to the present invention.

FIG. 22 illustrates an example in which use is made of rhomboid bodies instead of the spheres illustrated in the first embodiment.

When the rhomboid bodies of this example are used, the area of contact between the solid bodies is enlarged. As a result, owing to frictional contact between adjacent solid bodies, the vibration damping effect per unit weight is made larger than that obtained with the spherical bodies. This made it possible to obtain equivalent external cutting effects with vibration dampers the weight of which was reduced by about 15% in comparison with the vibration dampers consisting of the steel balls used in the cylinder member described in the first embodiment.

FIG. 23 illustrates barrel-shaped bodies 2 used instead of the spheres.

When the barrel-shaped bodies of this example are used, the area of contact between the vibration dampers and cylinder member is enlarged. Since the vibration dampers flexibly accommodate themselves to the shape of the inner surface of the cylinder member. As a result, the vibration damping effect per unit weight is raised in comparison with the case in which the spherical solids are used. This made it possible to obtain equivalent effects with vibration dampers the weight of which was reduced by about 10% in comparison with the vibration dampers consisting of the steel balls described in the first embodiment.

FIG. 24 illustrates an example in which a viscous fluid 5 is sealed between the steel spheres in the resilient bag of the vibration damping means according to the first embodiment. In this case, the vibration damping effect is increased by sealing a viscous fluid such as silicone oil in the resilient bag. In addition, the number of enclosed solid bodies can be reduced. This made it possible to obtain equivalent effects with vibration dampers the weight of which was reduced by about 10~20% in comparison with the vibration dampers described in the first embodiment.

Figure 25:
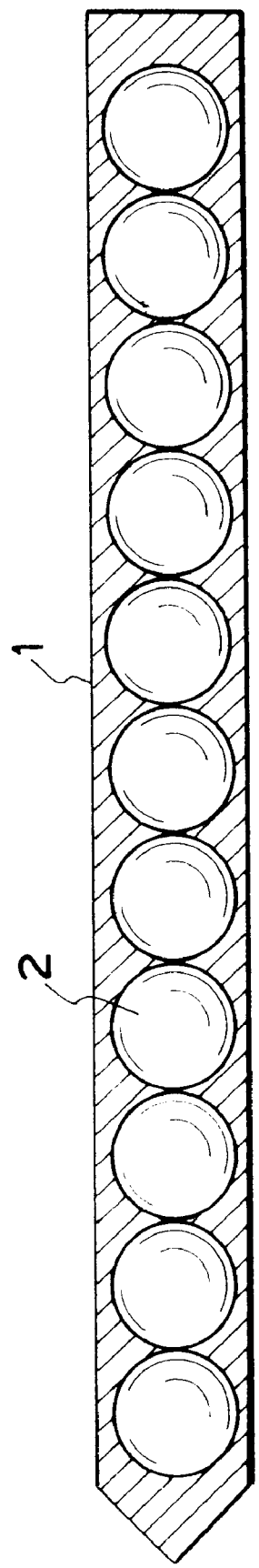
FIG. 25 is a central sectional view showing another modification of vibration dampers.

FIG. 25 illustrates an example in which spheres 2 are insert-molded with a resin material 1 instead of making use of the resilient bag. The resin material selected has a hardness of 40~60, one example of which is the above-mentioned urethane rubber. In this case, a plurality of solid bodies are arranged in a row when the resilient body is molded. As a result, the body can be made longitudinally symmetrical. This facilitates automation of the machining process inclusive of the step of inserting the vibration dampers into the cylinder member.

Figure 26:
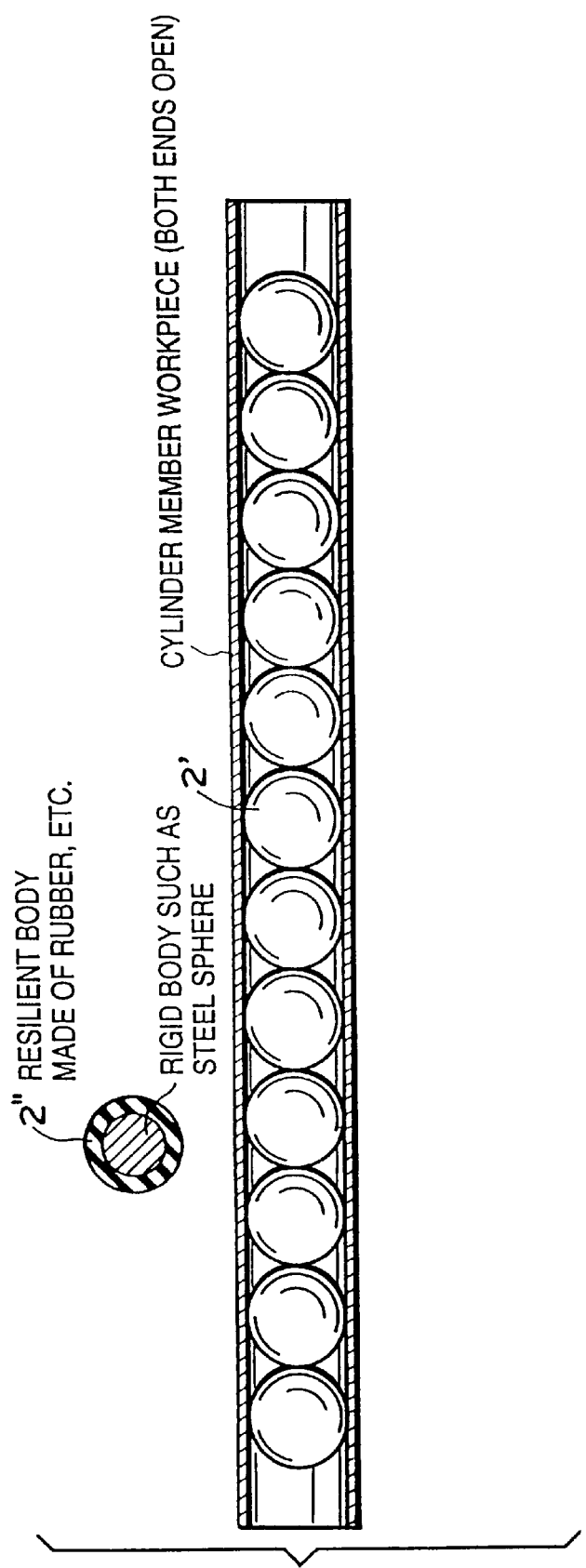
FIG. 26 is a central sectional view showing another modification of vibration dampers.
Figure 33:
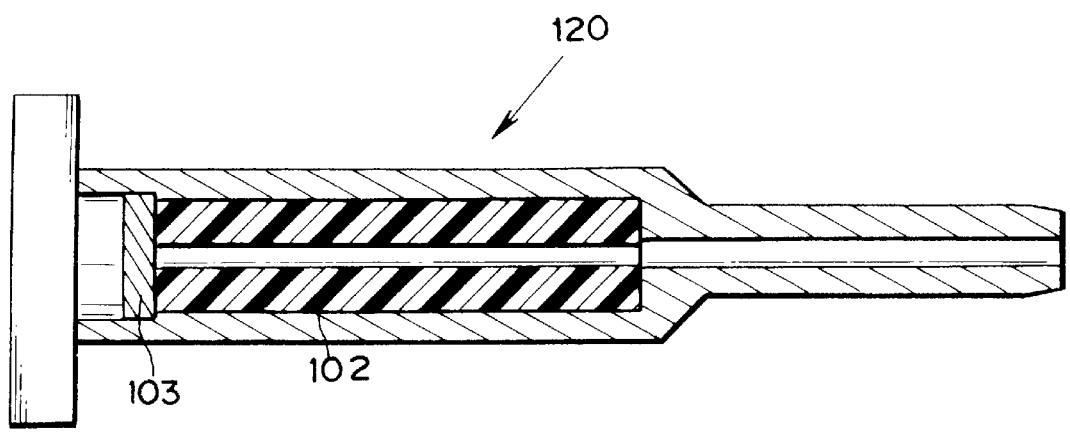
FIG. 33 is a central sectional view of a cylinder member holder.
Figure 34:
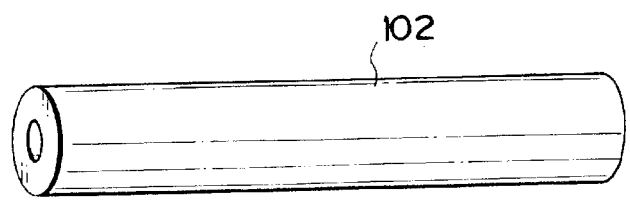
FIG. 34 is a perspective view showing the external appearance of a vibration damper.

FIG. 26 illustrates an example in which the surface of the steel spheres used in the first embodiment is coated with a rubber material, enabling the rubber-like bag to be omitted.

FIGS. 28, 29, 30 and 31 are tables showing results of cutting performed as described above. FIG. 28 is a table showing combinations of cylinder members and vibration dampers, FIG. 29 is a table showing tool rpm and the state of chatter occurrence when vibration dampers are and are not provided, FIG. 30 is a table showing the amount of deflection when vibration dampers are accommodated within a cylinder member, and FIG. 31 is a table showing the relationship between tare compensating load F and amount of deflection.

[Seventh Embodiment]

FIG. 32 is a diagram showing the principal components of a special-purpose machining apparatus used in a method of machining a cylinder member. Shown in FIG. 32 are the bed 1 serving as the base of the apparatus and the arched column 2 mounted on the bed 1. A cutting tool, described later, is rotatably supported on the column 2. A table support base 4 is mounted on the bed 1 and a table member 6 moves on the table support base 4. The slider support 8 is mounted on the left end of the table 6 in the view of FIG. 32, and the right post 18 is mounted on the right end of the table 6.

Left post 14 is mounted on the slider support 8. A left cylinder-member holder 120 is mounted on the left post 14 and the right cylinder-member holder 22 is mounted on the right post 18. The cylinder member W is fixedly supported at both ends by the left cylinder-member holder 120 and the right cylinder-member holder 22.

The arched column 2 has the bearing retaining member 2A in which the hollow shaft portion (not shown) of the cutting tool holder 24 (FIG. 7) is axially supported. The hollow portion of the hollow shaft portion of tool holder 24 is so adapted that the cylinder member to be machined may be passed through it. The tool holding portion 24A (FIG. 7) of the tool holder 24 is equipped with a holding portion which holds the finishing cutter 26 and a holding portion which holds the coarse cutter 28, each of the cutters being mounted by mounting means (screws).

The cylinder member W, which is to be machined into a developing sleeve used in the developing device of the above-described image forming apparatus, consisted of a Cu—Al alloy in which aluminum having purity of no less than 99.5% included 0.05~0.20% copper.

Alternatively, the cylinder member W consisted of a Cu—Mn—Al alloy which included 0.05~0.20% copper and 1.0~1.5% manganese, of a Si—Mg—Al alloy which included 0.20~0.60% silicon and 0.45~0.90% magnesium.

The raw material constituting the cylinder member was molded by extrusion or drawing to obtain a cylinder member having an outer diameter of 12.15 mm, an inner diameter of 10.4 mm (a wall thickness of 0.8 mm) and a total length of 250 mm.

Figure 35:
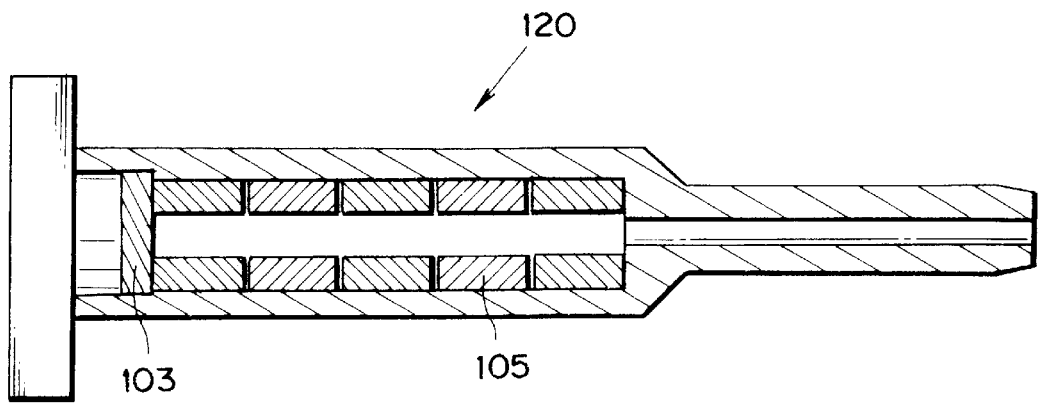
FIG. 35 is a central sectional view illustrating an improvement in which a vibration damper is made of a resilient body such as rubber and a plurality of solid bodies.
Figure 36:
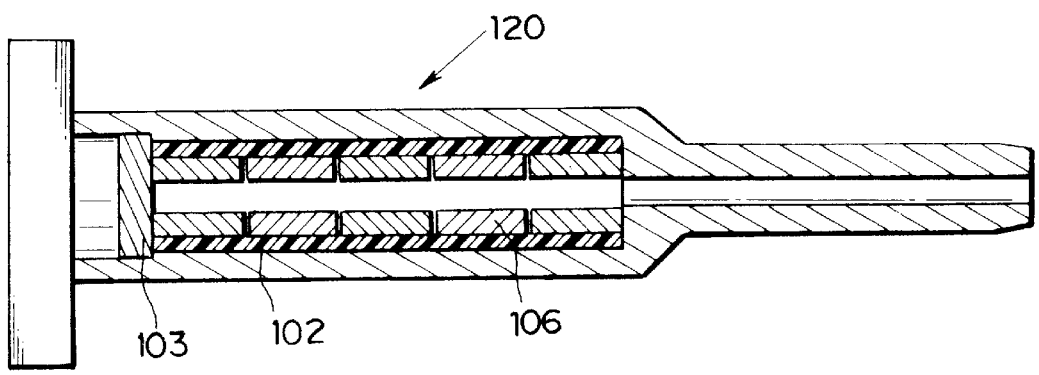
FIG. 36 is a central sectional view showing an improvement in which a vibration damper is made of a metal material exhibiting a vibration absorbing property, such as lead or cast iron.

FIG. 35 illustrates vibration damping means incorporated as a machining jig inside the left holder, and FIG. 36 illustrates a cylinder of rubber serving as vibration damping means.

The vibration damping means was obtained by fabricating a cylindrical body 102 from a rubber material such as urethane rubber or silicone rubber and inserting the cylindrical body 102 into the left holder 120. The outer diameter of the cylindrical body 102 of rubber material was 22 mm, the inner diameter was 7 mm and the total length was 140 mm when the total length of the holder was 250 mm and the outer diameter of the reduced-diameter portion was 30 mm. The portion into which the vibration damping means was inserted had an inner diameter of 22 mm and a total length of 160 mm. A rubber hardness of 40~80 is effective.

A vibration damper for preventing chatter vibration caused by the resonant frequency of the workpiece per se is inserted into the hollow portion of the cylinder member W to be machined. If the compliance of the workpiece per se is small, then it is not necessary to insert the vibration damper into the central portion of the cylinder member W to be machined. The construction of the vibration damper inserted into the cylinder member is shown in FIGS. 35 and 36.

The cylinder member W is passed through the hollow portion of the tool holder 24 mounted in the bearing holding member 2A of the arched column 2 shown in FIG. 32, and both ends of the cylinder member are held non-rotatably by the left cylinder-member holder 120 and right cylinder-member holder 22.

After the cylinder member is set in this manner, the table 6 is placed at the left or right end and the position of the tool holder 24 is set at the starting position. The tool holder 24 is then rotated by drive means (a motor), not shown, connected to the tool holder. Furthermore, slider drive means for driving the aforementioned sliders is set to a slider feed rate.

In this example, machining was performed under the following conditions: depth of cut of coarse cutter: 0.06 mm; depth of cut of finishing cutter: 0.015 mm; tool holder rotating speed: 3000~18,000 rpm; feed rate of cylinder member: 5~30 mm/s (constant at 0.1 mm/rev).

FIGS. 39 and 40 illustrate the results obtained in a case where machining was performed under the above-mentioned machining conditions with and without the vibration damping means inside the cylinder member. More specifically, these show the results of machining obtained when the vibration dampers according to the present invention were introduced into the left holder and when a holder devoid of vibration dampers, as in the prior art, was used.

Though the present invention is applicable to an already existing cutting machine, the total length of the holder and the outer diameter of the portion through which limitations such as the axial length of the spindle of the machine. In a case where the overall length is large and in a case where the outer diameter of the portion through which the spindle is passed is small, the compliance value of the holder is large and chatter vibration tends to occur. In such cases an improvement for the purpose of lowering the compliance value of the holder is required.

FIGS. 35 and 36 illustrate a modification of the left cylinder-member holder 120 and a modification of the construction of the vibration dampers incorporated in the holder. In FIG. 36, one or more ring-shaped solid bodies made of metal inserted into the inner-diameter portion of the rubber cylindrical body 102 are used as the vibration damping means. The purpose of this is to raise the attenuating capability of the vibration dampers by increasing the weight of the vibration dampers per se. In FIG. 35, the vibration damping means is composed of a metal material 105 exhibiting a vibration absorbing property, such as lead or cast iron.

These modifications are effective when used in a situation where the configuration that must be adopted is one in which the compliance value of the tool is large and chatter vibration tends to occur, such as in a case where a satisfactory vibration damping property is not obtained owing to the above-described construction of the vibration dampers, i.e., a case where the dimensions, particularly the outer diameter, of the holder itself are small or the overall length is large. Since the weight of the vibration dampers inserted into the workpiece can be minimized, the straightness at the outer diameter after machining is excellent and a high machining accuracy can be achieved.

Figure 37:
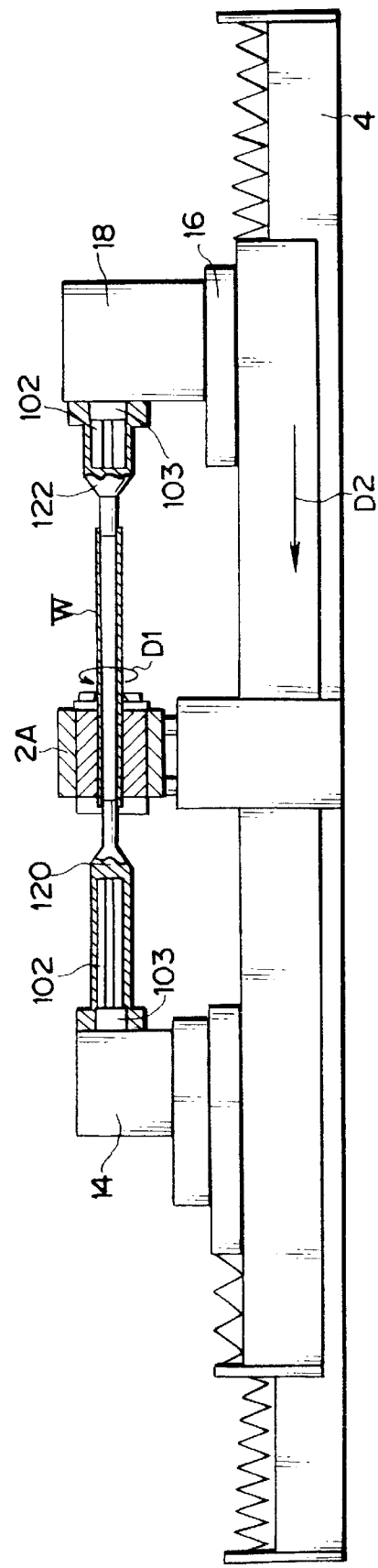
FIG. 37 is a diagram showing the principal components of a special-purpose machining apparatus.

FIG. 37 is a diagram showing the principal components of a special-purpose machining apparatus used in a method of machining a cylinder member when use is made of the chatter vibration preventing means also in a right holder 122 of the cylinder member.

Figure 38:
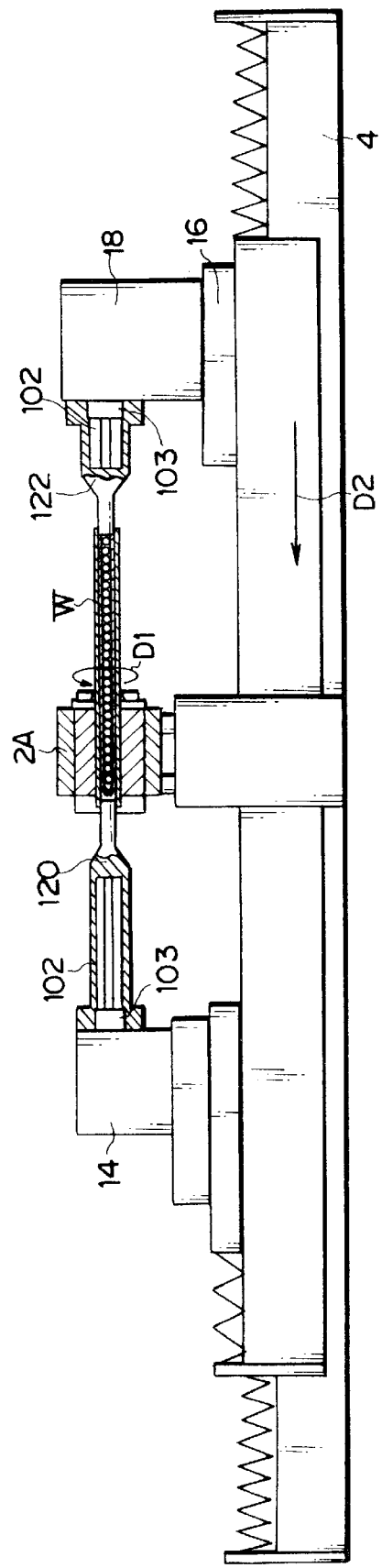
FIG. 38 is a diagram showing the principal components of a special-purpose machining apparatus.
Figure 41:
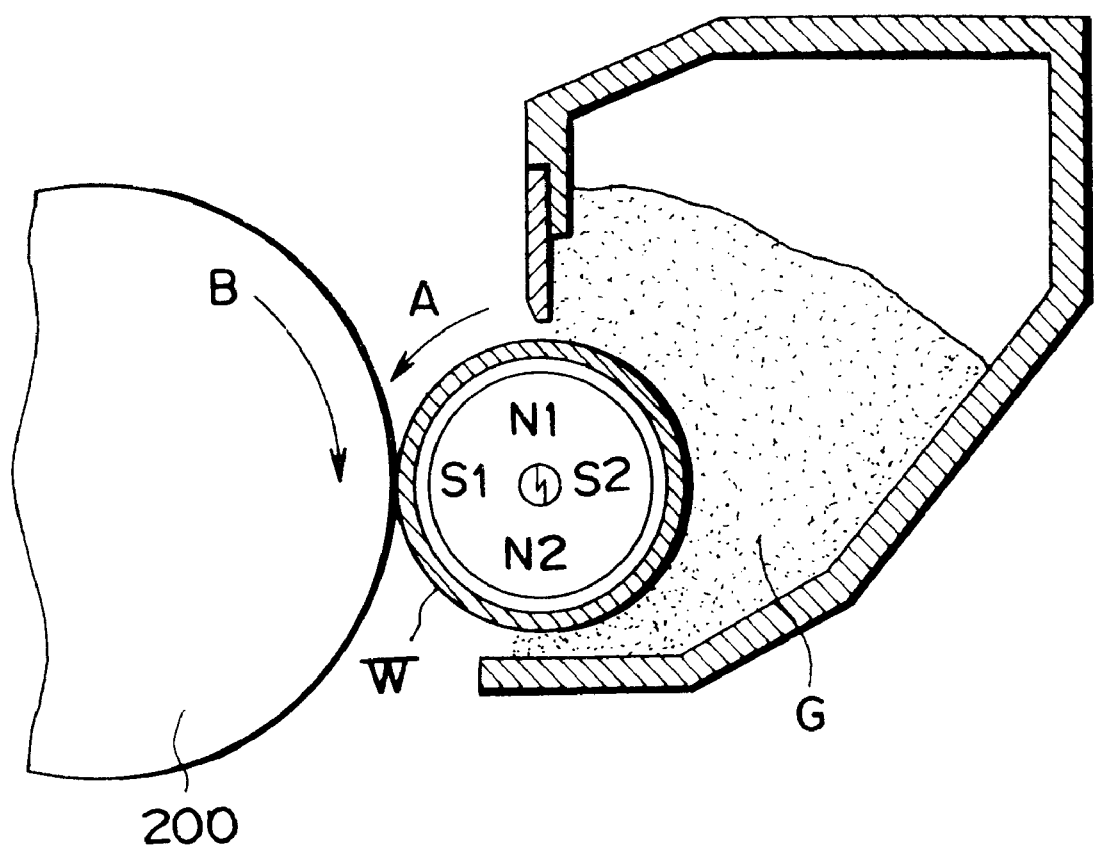
FIG. 41 is a central sectional view showing an image forming apparatus to which the present invention is applied.
Figure 42:
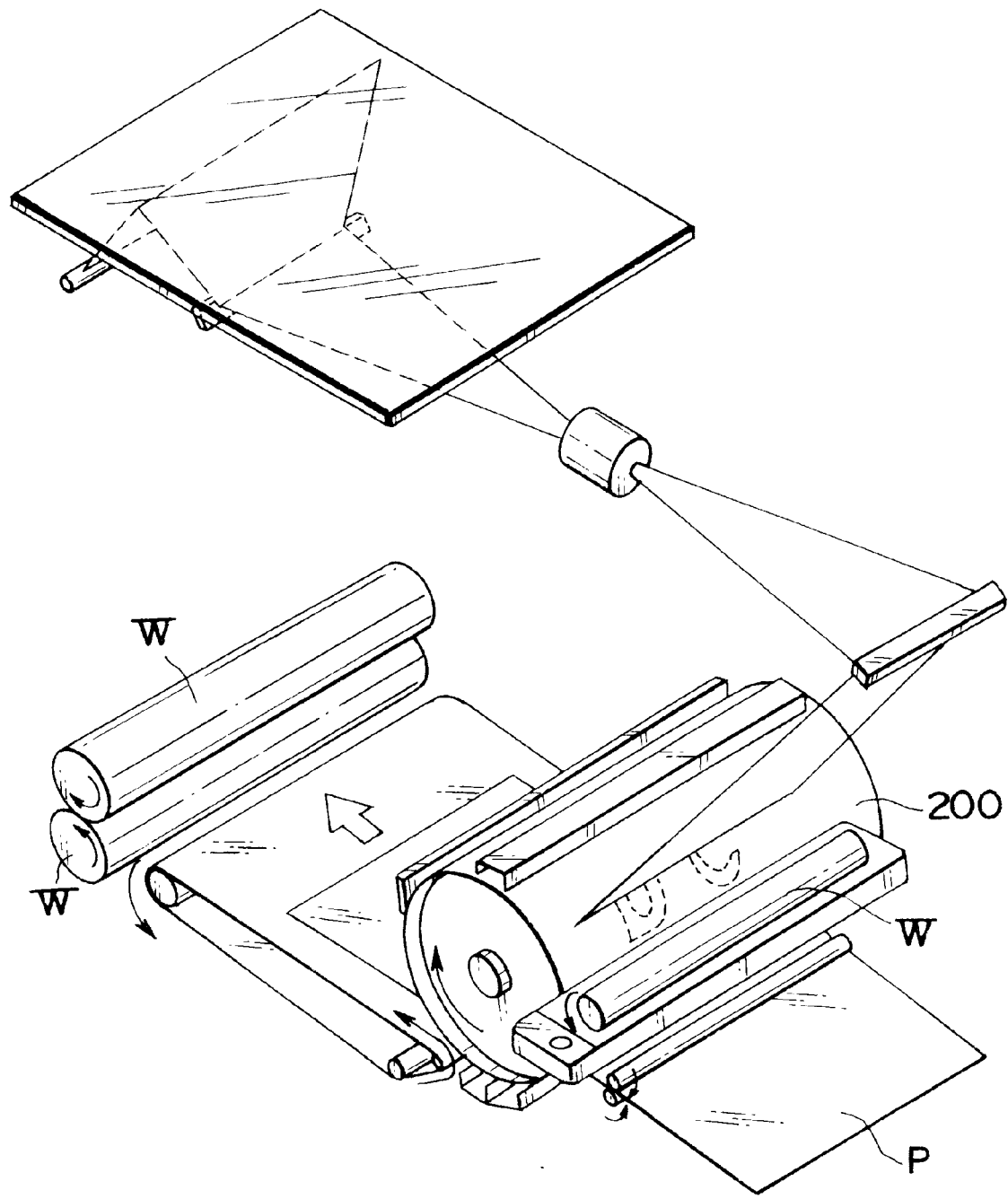
FIG. 42 is an external perspective view showing an image forming apparatus to which the present invention is applied.
Figure 43:
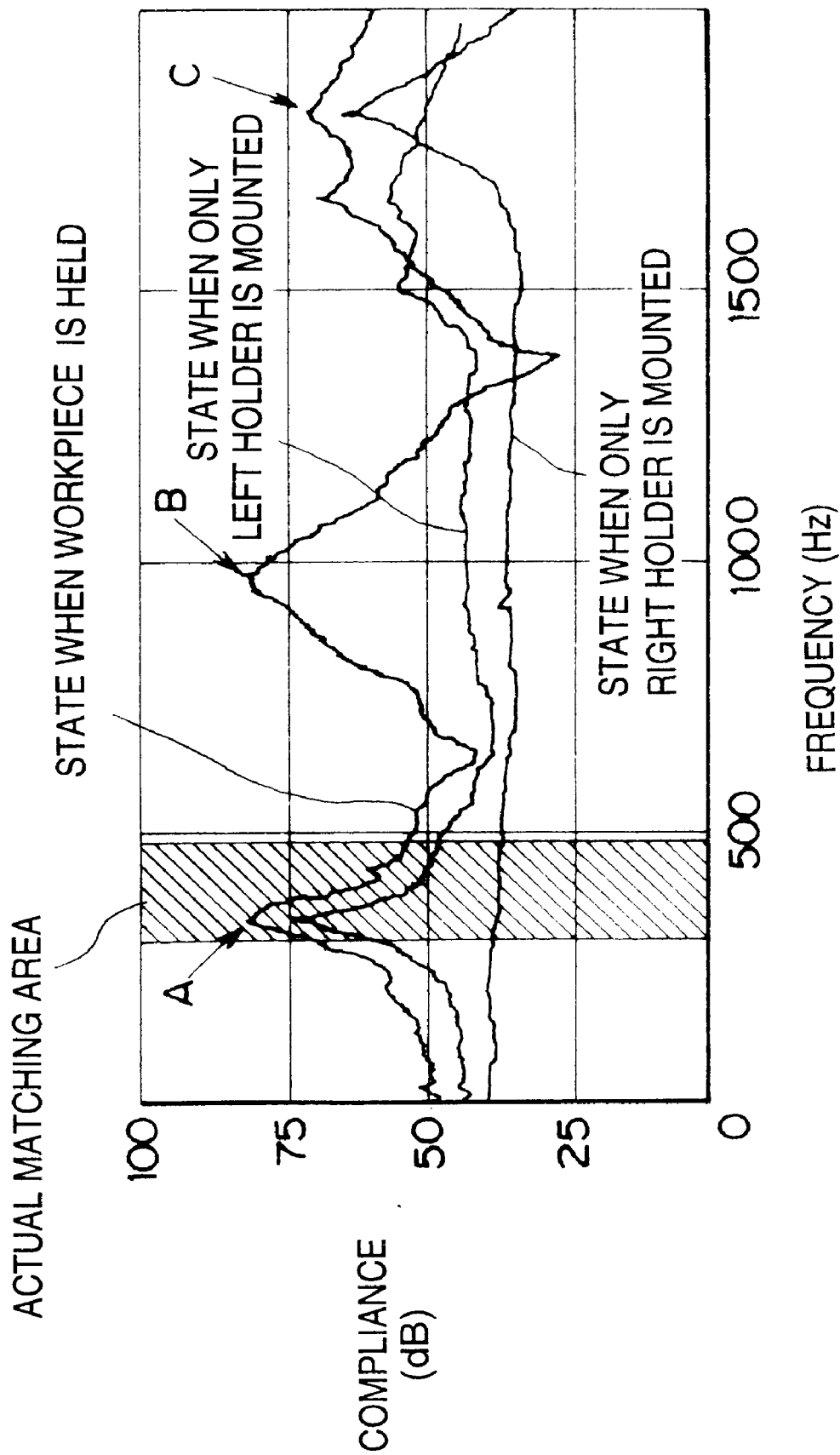
FIG. 43 is a graph for describing the relationship between vibration characteristic and frequency.

FIG. 38 is a diagram showing the principal components of a special-purpose machining apparatus when use is made of the chatter vibration preventing means also in the right holder 122 of the cylinder member and in the cylinder member as well.

FIG. 39 is a table showing combinations of cylinder members and vibration dampers in the arrangement of FIG. 32. This table shows the relationship among tool rotating speed, occurrence of chatter vibration when the vibration dampers are and are not provided, and surface roughness. FIG. 40 is a table showing chatter vibration when vibration dampers are accommodated within a cylinder member.

[Effects of the Invention]

Thus, as described above, the present invention provides a method of machining the outer circumferential surface of a cylinder member by supporting the cylinder member non-rotatably and causing a machining tool to rotate about the outer circumferential surface of the cylinder member, wherein machining is performed upon inserting a plurality of discontinuous solid bodies into the cylinder member, thereby making it possible to prevent a decline in the precision of the machined surface brought about by chatter produced by vibration of the revolving machining tool.

Furthermore, the plurality of discontinuous solid bodies are made into spheres, the diameter of which is smaller than the inner diameter of the cylinder member, thereby applying a distributed load to the inner periphery of the cylinder member so as to facilitate the vibration damping effect.

At least part of the plurality of solid bodies have a mass distribution. This provides a more precise vibration damping effect and, as a result, raises the roughness precision of the machined surface of the cylinder member.

Further, the length of the discontinuous solid bodies in the axial direction of the cylinder member in the axial direction thereof is designed so as to fall within a range which is 20~50% of the length of the cylinder member in the axial direction thereof, thereby reducing weight.

Further, a closed end of an elongated bag is provided with a hole, a plurality of the spheres are introduced into the bag from the other open end thereof, the bag is placed inside the cylinder member to be machined, and machining is performed by supporting the cylinder member non-rotatably and causing a machining tool to revolve about the outer circumferential surface of the cylinder member. This makes it possible to raise the finishing precision of the surface of the cylinder member to be machined.

Furthermore, the present invention provides a tool which, in order to improve machined surface precision by preventing vibration produced with the outer circumferential surface of a cylinder member is subjected to cutting machining, machines the outer circumferential surface of the cylinder member by supporting the cylinder member non-rotatably and causing a machining tool to revolve about the outer circumferential surface of the cylinder member.

The plurality of solid bodies comprise a combination of metallic spheres and synthetic resin spheres. This makes it possible to provide greater applicability by means for adjusting the weight of the vibration damping means.

Further, in a case where a cylinder member is supported non-rotatably and the surface of the cylinder member is machined by revolving a machining tool such as a cutter on the outer circumferential surface of the cylinder member, the precision to which the cylinder member is machined can be improved by correcting a decline in straightness caused by deflection of the cylinder member arising from the dimensions of the cylinder member.

Further, the present invention provides a method of machining the outer circumferential surface of a cylinder member by supporting the cylinder member non-rotatably and causing a machining tool to rotate about the outer circumferential surface of the cylinder member, wherein vibration dampers are incorporated within a holder supporting the cylinder member. This makes it possible to suppress the peak of compliance values at the characteristic frequency of the left holder produced in a frequency region near the machining frequency. The holder can be made s dynamically rigid and it is possible to prevent a decline in machined surface precision that accompanies chatter produced by vibration of the revolving machining tool. Furthermore, in a case where the vibration damping effect of the holder alone is not satisfactory, a method employed jointly involves inserting vibration dampers into the workpiece. The weight of the vibration dampers inserted into the workpiece can be made much smaller in comparison with the prior-art method, in which vibration dampers are inserted into the workpiece alone. This makes it possible to reduce deflection and deformation of the workpiece. There is no need to provide a collateral mechanism such as a pressurizing mechanism requiring a troublesome adjustment operation, and shape precision such as straightness after machining can be obtained with ease.

Furthermore, even in situations where the shape of the holders is disadvantageous in terms of the vibration characteristic owing to limitations upon the machining apparatus to which the present invention is applied, vibration damping effects equivalent to those mentioned above can be obtained by adopting a resilient body and a plurality of solid bodies as the incorporated vibration dampers or by adopting metallic solid bodies having a vibration damping property as the incorporated vibration dampers.

As many apparently widely different embodiments of the present invention can be made without departing from the spirit and scope thereof, it is to be understood that the invention is not limited to the specific embodiments thereof except as defined in the appended claims.

What is claimed is:

1. A vibration damper for use with a tubular cylinder member having an outer circumferential surface and subjected to cutting machining by non-rotatably supporting left and right ends of the tubular cylinder member by left and right holders and feeding a cutting tool longitudinally of the cylinder member while causing the cutting tool to rotate about the outer circumferential surface of the cylinder member, said vibration damper comprising:

a plurality of discontinuous solid bodies which fill an inner diameter portion of the cylinder body so as to lie along the longitudinal direction thereof and contained within a resilient body, such that chatter vibration produced at cutting is reduced or eliminated.

2. The vibration damper according to claim 1, wherein said solid bodies have an outer diameter smaller than the inner diameter of the cylinder member.

3. The vibration damper according to claim 1, wherein said solid bodies are formed to have the approximate shape of abacus beads having two or more continuous protrusions.

4. The vibration damper according to claim 2 or 3, wherein said solid bodies are accommodated in an elongated bag of said resilient body.

5. A machining method comprising the steps of:
using a cylinder member holder for subjecting the outer circumferential surface of a tubular cylinder member to cutting machining by non-rotatably supporting left and right ends of the tubular cylinder member by left and right holders and feeding a cutting tool longitudinally of the cylinder member while causing the cutting tool to rotate about the outer circumferential surface of the cylinder member; and
forming a resilient layer having a prescribed thickness on surfaces of rigid spherical bodies or cylindrical bodies and inserting the rigid bodies individually along the longitudinal direction of the cylinder member to fill the inner diameter portion of the cylinder member, whereby chatter vibration produced at cutting is reduced or eliminated.

6. The vibration damper according to claim 1, wherein when a plurality of said solid bodies have been inserted into the cylinder member, the length of said solid bodies in the axial direction of the cylinder member is designed so as to fall within a range which is 20~50% of the length of the cylinder member.

7. The vibration damper according to claim 1, wherein a closed end of said elongated bag is provided with a hole and a plurality of said spheres are introduced into said elongated bag from the other open end thereof, after which the opening of said elongated bag is provided with a plug.

8. The vibration damper according to claim 1, wherein a plurality of spheres are introduced into said elongated bag from an open end thereof, after which a viscous material which includes silicone oil is introduced to fill said elongated bag and the opening of said elongated bag is provided with a plug.

9. The vibration damper according to claim 1, wherein the plurality of said spheres are integrally molded from a prescribed resin material having a prescribed hardness.

10. A vibration damper for use with a tubular cylinder member having an outer circumferential surface and subjected to cutting machining by non-rotatably supporting left and right ends of the tubular cylinder member by left and right holders and feeding a cutting tool longitudinally of the cylinder member while causing the cutting tool to rotate about the outer circumferential surface of the cylinder member, said vibration damper comprising:
a resilient layer having a prescribed thickness formed on surfaces of rigid spherical bodies or cylindrical bodies in order that said rigid bodies may be inserted individually along the longitudinal direction of said cylinder member, wherein
said rigid bodies fill the inner diameter portion of the cylinder member, such that chatter vibration produced at cutting is reduced or eliminated.

11. A machining method comprising the steps of:
using a cylinder member holder for subjecting an outer circumferential surface of a tubular cylinder member to cutting machining by non-rotatably supporting left and right ends of the tubular cylinder member by left and right holders and feeding a cutting tool longitudinally of the cylinder member while causing the cutting tool to rotate about the outer circumferential surface of the cylinder member; and
filling a plurality of discontinuous solid bodies contained in a resilient body into an inner diameter portion of the cylinder body so as to lie along the longitudinal direction thereof, whereby high-speed cutting machining is performed and chatter vibration produced at cutting is reduced or eliminated.

12. The method according to claim 11, wherein the solid bodies have an outer diameter smaller than the inner diameter of the cylinder member.

13. The method according to claim 11, further comprising the step of forming the solid bodies to have the approximate shape of abacus beads having two or more continuous protrusions.

14. In a machining apparatus equipped with a cylinder member holder for subjecting an outer circumferential surface of a tubular cylinder member to cutting machining by non-rotatably supporting left and right ends of the tubular cylinder member by left and right holders and feeding a cutting tool longitudinally of the cylinder member while causing the cutting tool to rotate about the outer circumferential surface of the cylinder member, a vibration damper comprising:
a plurality of discontinuous solid bodies which fill an inner diameter portion of the cylinder body so as to lie along the longitudinal direction thereof and contained within a resilient body, such that high-speed cutting machining is performed and chatter vibration produced at cutting is reduced or eliminated.

15. The apparatus according to claim 14, wherein said solid bodies have an outer diameter smaller than the inner diameter of the cylinder member.

16. The apparatus according to claim 14, wherein said solid bodies are formed to have the approximate shape of abacus beads having two or more continuous protrusions.

17. The apparatus according to claim 16, wherein said solid bodies are accommodated in an elongated bag of said resilient body.

18. The method according to claim 12 or 13, further comprising the step of accommodating the solid bodies in an elongated bag of the resilient body.

19. The apparatus according to claim 14, wherein when a plurality of said solid bodies have been inserted into the cylinder member, the length of said solid bodies in the axial direction of the cylinder member is designed so as to fall within a range which is 20~50% of the length of the cylinder member.

20. The apparatus according to claim 17, wherein a closed end of said elongated bag is provided with a hole and a plurality of said spheres are introduced into said elongated bag from the other open end thereof, after which the opening of said elongated bag is provided with a plug.

21. The apparatus according to claim 17, wherein a plurality of spheres are introduced into said elongated bag from the an open end thereof, after which a viscous material which includes silicone oil is introduced to fill said elongated bag and the opening of said elongated bag is provided with a plug.

22. The apparatus according to claim 14, wherein the plurality of said spheres are integrally molded from a prescribed resin material having a prescribed hardness.

23. In a machining apparatus equipped with a cylinder member holder for subjecting an outer circumferential surface of a tubular cylinder member to cutting machining by non-rotatably supporting left and right ends of the tubular cylinder member by left and right holders and feeding a cutting tool longitudinally of the cylinder member while causing the cutting tool to rotate about the circumferential surface of the cylinder member, a vibration damper comprising:

a resilient layer having a prescribed thickness formed on surfaces of rigid spherical bodies or cylindrical bodies, with said rigid bodies contained in an inner diameter portion of said cylinder member and arranged individually along the longitudinal direction of said cylinder member, such that chatter vibration produced at cutting is reduced or eliminated.

24. The method according to claim 11, wherein when a plurality of the solid bodies have been inserted into the cylinder member, the length of the solid bodies in the axial direction of the cylinder member is designed so as to fall within a range which is 20~50% of the length of the cylinder member.

25. The method according to claim 18, further comprising the step of providing a closed end of the elongated bag with a hole and introducing a plurality of the spheres into the elongated bag from the other open end thereof, after which the opening of the elongated bag is provided with a plug.

26. The method according to claim 18, further comprising the step of introducing a plurality of spheres into the elongated bag from an open end thereof, after which a viscous material which includes silicone oil is introduced to fill the elongated bag and the opening of the elongated bag is provided with a plug.

27. The method according to claim 11, further comprising the step of integrally molding the plurality of the spheres from a prescribed resin material having a prescribed hardness.

* * * * *

UNITED STATES PATENT AND TRADEMARK OFFICE
CERTIFICATE OF CORRECTION

PATENT NO. : 5,898,984

DATED : May 4, 1999

INVENTOR(S): HIROSHI CHIBA, ET AL.

It is certified that error appears in the above-identified patent and that said Letters Patent is hereby corrected as shown below:

Title page, item

[30] FOREIGN APPLICATION PRIORITY DATA:

"8-130060" should read --9-130060--.

COLUMN 2:

Line 21, "aphotosensitive" should read
--a photosensitive--.

COLUMN 9:

Line 17, "now-be" should read --now be--.

COLUMN 19:

Line 26, "claim 1," should read --claim 4,--.
Line 31, "claim 1," should read --claim 4,--.

Signed and Sealed this

Fourth Day of July, 2000

Attest:

Q. TODD DICKINSON

*Attesting Officer*          *Director of Patents and Trademarks*